(12) United States Patent
Shinzou

(10) Patent No.: US 7,738,342 B2
(45) Date of Patent: Jun. 15, 2010

(54) OPTICAL PICKUP DEVICE

(75) Inventor: Toru Shinzou, Sagamihara (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 462 days.

(21) Appl. No.: 11/918,625

(22) PCT Filed: Apr. 19, 2006

(86) PCT No.: PCT/JP2006/308682

§ 371 (c)(1),
(2), (4) Date: Oct. 16, 2007

(87) PCT Pub. No.: WO2006/115262

PCT Pub. Date: Nov. 2, 2006

(65) Prior Publication Data

US 2009/0059768 A1     Mar. 5, 2009

(30) Foreign Application Priority Data

Apr. 21, 2005 (JP) ............................. 2005-124332

(51) Int. Cl.
 *G11B 7/00* (2006.01)
(52) U.S. Cl. .............................. 369/112.01; 369/112.02
(58) Field of Classification Search .............. 369/44.37, 369/112.1, 112.01, 112.03, 112.02, 44.23, 369/44.24
See application file for complete search history.

(56) References Cited

U.S. PATENT DOCUMENTS 5,930,214 A    7/1999   Kasahara et al.

(Continued)

FOREIGN PATENT DOCUMENTS

EP    0 936 604    8/1999

(Continued)

OTHER PUBLICATIONS

International Preliminary Examination Report (Application No. PCT/JP2006/308682) dated Nov. 1, 2007.

(Continued)

*Primary Examiner*—Nabil Z Hindi
(74) *Attorney, Agent, or Firm*—Eric J. Robinson; Robinson Intellectual Property Law Office, P.C.

(57) ABSTRACT

An optical pickup device enables prevention of an increase of spherical aberration during tracking without needing any finite optical system. The diameters of parallel light beams (A, B, C) for the next-generation DVDs, DVDs, and CDs are limited to diameters of a, b, c (a>b>c) in accordance with the NA for each type by a light beam limiting element, the diameter of light beam B is limited to the diameter ranges of b to c and d (=0.85×c) to e (d>e>0), the diameter of the light beam C is limited to the diameter ranges of c to d and less than e. They are passed through a phase correcting element (13B) and focused on the corresponding optical recording medium signal planes by means of a common objective lens. The objective lens is so optimized that the wave front aberration to the light beam A is minimum on the signal plane of the next generation DVD. The phase correcting element (13B) has a phase correcting zones (Z1 to Z4) of diffraction optical structure exhibiting a pseudo-kinoform shape of a step constitution. The spherical aberration to the light beam B is corrected in the zones (Z1, Z3). The spherical aberration to the light beam C is corrected in the zones (Z2, Z4). The light beam A is passed through all the zones of the light beam diameter a without changing the parallel light beam state by optimizing the step heights of the zones (Z1 to Z4).

16 Claims, 26 Drawing Sheets

U.S. PATENT DOCUMENTS

| | | |
|---|---|---|
| 6,166,854 A | 12/2000 | Katsuma |
| 6,363,037 B1 | 3/2002 | Yamazaki |
| 7,345,967 B2 * | 3/2008 | Hirai .................. 369/44.32 |
| 2005/0002313 A1 | 1/2005 | Hayashi |

FOREIGN PATENT DOCUMENTS

| EP | 0 962 921 | 12/1999 |
|---|---|---|
| EP | 1 341 166 | 9/2003 |
| JP | 07-302437 | 11/1995 |
| JP | 09-145995 | 6/1997 |
| JP | 2000-056216 | 2/2000 |
| JP | 2005-011466 | 1/2005 |
| JP | 2005-085340 | 3/2005 |

OTHER PUBLICATIONS

Supplementary European Search Report (Application No. 06732338.6) Dated Nov. 5, 2008.

Yamada, M. et al., "DVD/CD/CD-R Compatible Pick-Up With Two-Wavelength Two-Beam Laser," IEEE Transactions on Consumer Electronics, vol. 44, No. 3, Aug. 1988, pp. 591-600.

International Search Report (Application No. PCT/JP2006/308682).

* cited by examiner (1)

(2)

(3)

OPTICAL PICKUP DEVICE

TECHNICAL FIELD

The present invention relates to an optical pickup device and, more particularly, to an optical pickup device which guides each of a plurality of light beams having wavelengths different from one another corresponding to a plurality of optical recording media having specifications different from one another to a common objective lens and focuses the light beams on an optical recording medium.

BACKGROUND ART

CDs and DVDs (digital versatile disks) currently in widespread use each have a capacity of several hundreds of megabytes to several gigabytes. The development and commercialization of next generation DVDs (also referred to as high-definition DVDs) which are optical recording media having a larger capacity of several tens of gigabytes are under way in response to a recent increase of the quality of images. Along with a demand for smaller size and lower cost, an optical pickup which records data on and/or plays back data from a next generation DVD is desired to adopt a compatible technology for enabling itself also to record data on and/or play back data from DVDs and CDs which are conventional optical recording media using a common objective lens. However, the optical recording media differ from one another in used wavelength, numerical aperture (NA), and the thickness of a signal plane protecting substrate, as shown in Table 1. Accordingly, if a common objective lens is used, spherical aberration cannot be corrected, and it is impossible to normally record or play back information.

[Table 1]

TABLE 1

| Optical recording medium type | Used wavelength (nm) | NA | Thickness of protecting substrate (mm) |
|---|---|---|---|
| Next generation DVD 1 | 405 | 0.85 | 0.1 |
| Next generation DVD 2 | 405 | 0.65 | 0.6 |
| DVD | 650 | 0.6 | 0.6 |
| CD | 780 | 0.45 | 1.2 |

FIG. 1 shows an optical pickup which records information on and/or plays back information from a plurality of optical recording media having specifications different from one another using a phase correcting element in order to solve the above-described problem (see Japanese Patent Application Laid-Open No. 2004-246931). In FIG. 1, an objective lens 1 is designed such that the wave front aberration to light having a wavelength corresponding to a next generation DVD is minimum on the signal plane of an optical recording medium (next generation DVD) 2-1 when the light is incident as a parallel light beam. A DVD hologram module 3 and a CD hologram module 4, in each of which light receiving and emitting units are packaged, are used as DVD and CD light sources. A light beam radiated from a next generation DVD semiconductor laser 5 is transformed into a parallel light beam by a collimator lens 6, passes through a deflection beam splitter 7 and DVD and CD dichroic prisms 8 and 9 for light beam separation, and changes its direction 90° by a prism 10.

A wavelength plate 11 changes the state of polarization of the light beam from linear polarization into circular polarization, and an aperture restriction element 12 restricts the diameter of the light beam to a light beam diameter corresponding to the NA of a next generation DVD. The light beam passes through a phase correcting element 13 without changing its parallel light beam state (with an equiphase wave surface kept planar), comes incident on the objective lens 1, and is focused on the signal plane of the optical recording medium (next generation DVD) 2-1, thereby recording and/or playing back information. A light beam reflected from the optical recording medium 2-1 is transformed into a circularly polarized light beam having an opposite rotational direction and is transformed into a parallel light beam by the objective lens 1. The wavelength plate 11 changes the state of polarization of the light beam from circular polarization into linear polarization such that the resultant linearly polarized light beam is orthogonal to the original linearly polarized light beam. The light beam changes its direction 90° by the prism 10, is reflected by the deflection beam splitter 7, and is focused on a light receiving element 15 by a detecting lens 14. A light beam radiated from the DVD hologram module 3 is transformed into a parallel light beam by a coupling lens 16, is reflected by the dichroic prism 8, passes through the dichroic prism 9, and changes its direction 90° by the prism 10. The wavelength plate 11 changes the state of polarization of the light beam from linear polarization into circular polarization, the aperture restriction element 12 restricts the diameter of the light beam to a light beam diameter corresponding to the NA of a DVD, and the phase correcting element 13 corrects the spherical aberration to the light beam. The light beam comes incident on the objective lens 1 and is focused on the signal plane of an optical recording medium (DVD) 2-2, thereby recording and/or playing back information. A light beam reflected from the optical recording medium 2-2, which is a DVD, is transformed into a circularly polarized light beam having an opposite rotational direction and is transformed into a parallel light beam by the objective lens 1 and phase correcting element 13. The wavelength plate 11 changes the state of polarization of the light beam from circular polarization into linear polarization such that the resultant linearly polarized light beam is orthogonal to the original linearly polarized light beam. The light beam changes its direction 90° by the prism 10, is reflected by the dichroic prism 8, and is focused on a light receiving element of the DVD hologram module 3 by the coupling lens 16. A light beam radiated from the CD hologram module 4 is transformed into a predetermined divergent light beam by a coupling lens 17, is reflected by the dichroic prism 9, and changes its direction 90° by the prism 10. The wavelength plate 11 changes the state of polarization from linear polarization into circular polarization, and the aperture restriction element 12 restricts the diameter of the light beam to a light beam diameter corresponding to the NA of a CD. The light beam passes through the phase correcting element 13 without changing the shape of an equiphase wave surface, comes incident on the objective lens 1, and is focused on the signal plane of an optical recording medium (CD) 2-3, thereby recording and/or playing back information. A light beam reflected from the optical recording medium 2-3 is transformed into a circularly polarized light beam having an opposite rotational direction and is transformed into a predetermined convergent light beam by the objective lens 1. The wavelength plate 11 changes the state of polarization of the light beam from circular polarization into linear polarization such that the resultant linearly polarized light beam is orthogonal to the original linearly polarized light beam. The light beam changes its direction 90° by the prism 10, is reflected by the dichroic prism 9, and is focused on a light receiving element of the CD hologram module 4 by the coupling lens 17.

In the conventional example in FIG. 1, it is necessary for a light beam having at least one wavelength to configure the optical system using a finite optical system, and a light beam having the wavelength suffers from the problem of exacerbated spherical aberration during tracking of the objective lens 1. To set the angle of incidence from a finite optical system on the objective lens 1 to a desired value, intervals at which units of the optical system are arranged need to be set to a specific value. The process of giving phase shifts which are integer multiples of $2\pi$ to light beams having wavelengths corresponding to a next generation DVD and CD which are not exactly integer multiples by the common phase correcting element and allowing the light beams to pass through the common phase correcting element without changing the shape of an equiphase wave surface limits the types of glasses available for use in the phase correcting element to specific ones. Accordingly, the flexibility in configuring the optical system becomes extremely lower, and designing of the optical system becomes difficult.

DISCLOSURE OF THE INVENTION

The present invention has been made in consideration of the above-described conventional problems, and has as its object to provide an optical pickup device which enables prevention of exacerbation of spherical aberration during tracking of an objective lens without needing any finite optical system and securement of the flexibility in configuring an optical system.

A first aspect of the present invention is an optical pickup device including k light emitting elements which radiate light beams having wavelengths different from one another corresponding to k optical recording media different from one another in specifications including a used wavelength, a numerical aperture (NA), and a thickness of a signal plane protecting substrate, a common objective lens which focuses the light beams radiated from the light emitting elements on the k optical recording media, which are interchangeably mounted at a predetermined location, and an optical system which transforms the light beams radiated from the light emitting elements into parallel light beams and guides the parallel light beams to the objective lens such that axes coincide with a light axis of the objective lens, characterized in that light beam restriction means and phase correcting means are located backward and forward between the optical system and the objective lens such that the phase correcting means are nearer the objective lens in relation to the light beam restriction means, the light beam restriction means propagate each, of the k light beams having the different only at a portion wavelengths, and the phase correcting means correct phases of the k light beams, at least 2 k concentric toric or disciform phase correcting zones which do not overlap one another and are centered on a light axis are provided in the phase correcting means, each of the phase correcting zones exclusively performs phase correction on one of the k light beams having the different wavelengths, and the phase correcting means are configured such that each light beam undergoes phase correction in at least two of the phase correcting zones which are not adjacent to each other and are exclusive to the light beam, a plurality of transparent regions having wavelength selectivity which have respective same shapes as the phase correcting zones of the phase correcting means are provided around the light axis in the light beam restriction means, each of the phase correcting zones and a corresponding one of the transparent regions having wavelength selectivity, which have the same shape, are associated with each other, each of the transparent regions having wavelength selectivity propagates only the light beam having the wavelength, which is to be phase-corrected by the corresponding phase correcting zone, and the light beam restriction means are configured such that any one of the light beams having the wavelengths is not propagated at a region other than the transparent regions having wavelength selectivity.

A second aspect of the present invention is an optical pickup device including two light emitting elements which radiate light beams having wavelengths different from each other corresponding to two optical recording media different from each other in specifications including a used wavelength, a numerical aperture (NA), and a thickness of a signal plane protecting substrate, a common objective lens which focuses the light beams radiated from the light emitting elements on the two optical recording media, which are interchangeably mounted at a predetermined location, and an optical system which transforms the light beams radiated from the light emitting elements into parallel light beams and guides the parallel light beams to the objective lens such that axes coincide with a light axis of the objective lens, light beam diameters of $\phi 1$ and $\phi 2$ commensurate with the numerical apertures for the two optical recording media satisfying a relation $\phi 1 > \phi 2$, characterized in that of the two light beams, one having the light beam diameter of $\phi 1$ commensurate with the numerical aperture for the corresponding optical recording medium is referred to as a first light beam, and the other having the light beam diameter of $\phi 2$ is referred to as a second light beam, thereby distinguishing the light beams from each other, light beam restriction means and phase correcting means are located backward and forward between the optical system and the objective lens such that the phase correcting means are nearer the objective lens in relation to the light beam restriction means, the light beam restriction means propagate each of the first and second light beams only at a portion, and the phase correcting means correct phases of the first and second light beams, a toric first phase correcting zone for the first light beam which has an outer diameter of $\phi 1$ and an inner diameter smaller than $\phi 1$ and not less than $\phi 2$ and is centered on a light axis, a toric second phase correcting zone for the second light beam which has an outer diameter of $\phi 2$ and an inner diameter of $\phi 3$ smaller than $\phi 2$ and larger than 0 and is centered on the light axis, a toric third phase correcting zone for the first light beam which has an outer diameter of not more than $\phi 3$ and an inner diameter of $\phi 4$ larger than 0 and is centered on the light axis, and a toric or disciform fourth phase correcting zone which has an outer diameter of not more than $\phi 4$ and is centered on the light axis, in order from outermost to innermost, are provided in the phase correcting means, and four, first to fourth transparent regions having wavelength selectivity which have respective same shapes as the first to fourth phase correcting zones of the phase correcting means are provided around the light axis in the light beam restriction means, and the light beam restriction means are configured such that the first and third transparent regions having wavelength selectivity propagate the first light beam and do not propagate the second light beam, the second and fourth transparent regions having wavelength selectivity propagate the second light beam and do not propagate the first light beam, and either one of the first and second light beams is not propagated at a region other than the first to fourth transparent regions having wavelength selectivity.

An embodiment of the present invention is characterized in that the inner diameter of the first phase correcting zone is set to be approximately $\phi 1 \times 0.85$.

An embodiment of the present invention is characterized in that the inner diameter of φ3 of the second phase correcting zone is set to be approximately φ2×0.85.

An embodiment of the present invention is characterized in that each phase correcting zone is formed using a diffraction optical region exhibiting a pseudo-kinoform shape having stepped structures with two or more steps in cross section.

An embodiment of the present invention is characterized in that the phase correcting means and light beam restriction means are integrated into one piece by forming the phase correcting means and light beam restriction means on two sides of a common substrate or bonding the phase correcting means and light beam restriction means together.

An embodiment of the present invention is characterized in that a holding mechanism for the objective lens is caused to hold the phase correcting means together with the objective lens.

An embodiment of the present invention is characterized in that a holding mechanism for the objective lens is caused to hold the light beam restriction means and phase correcting means together with the objective lens.

A third aspect of the present invention is an optical pickup device including three light emitting elements which radiate light beams having wavelengths different from one another corresponding to three optical recording media different from one another in specifications including a used wavelength, a numerical aperture (NA), and a thickness of a signal plane protecting substrate, a common objective lens which focuses the light beams radiated from the light emitting elements on the three optical recording media, which are interchangeably mounted at a predetermined location, and an optical system which transforms the light beams radiated from the light emitting elements into parallel light beams and guides the parallel light beams to the objective lens such that axes coincide with a light axis of the objective lens, the objective lens being formed such that wave front aberration when a specific one of the light beams is focused on a corresponding specific one of the optical recording media is minimum, light beam diameters of φ0, φ1, and φ2 commensurate with the numerical apertures for the specific one optical recording medium and the other two optical recording media satisfying a relation φ0>φ1>φ2, characterized in that of the light beams except for the specific one light beam, the two light beams, one having the light beam diameter of φ1 commensurate with the numerical aperture for the corresponding optical recording medium is referred to as a first light beam, and the other having the light beam diameter of φ2 is referred to as a second light beam, thereby distinguishing the light beams from each other, light beam restriction means and phase correcting means are located backward and forward between the optical system and the objective lens such that the phase correcting means are nearer the objective lens in relation to the light beam restriction means, the light beam restriction means propagate the specific one light beam at a whole of a portion corresponding to the light beam diameter of φ0 commensurate with the numerical aperture for the specific one optical recording medium and propagate each of the first and second light beams only at a portion, and the phase correcting means propagate the specific one light beam without changing a parallel light beam state and correct phases of the first and second light beams, a toric first phase correcting zone for the first light beam which has an outer diameter of φ1 and an inner diameter smaller than φ1 and not less than φ2 and is centered on a light axis, a toric second phase correcting zone for the second light beam which has an outer diameter of φ2 and an inner diameter of φ3 smaller than φ2 and larger than 0 and is centered on the light axis, a toric third phase correcting zone for the first light beam which has an outer diameter of not more than φ3 and an inner diameter of φ4 larger than 0 and is centered on the light axis, and a toric or disciform fourth phase correcting zone which has an outer diameter of not more than φ4 and is centered on the light axis, in order from outermost to innermost, are provided in the phase correcting means, and four, first to fourth transparent regions having wavelength selectivity which have respective same shapes as the first to fourth phase correcting zones of the phase correcting means are provided around the light axis in the light beam restriction means, and the light beam restriction means are configured such that the first and third transparent regions having wavelength selectivity propagate the first light beam and specific one light beam and do not propagate the second light beam, the second and fourth transparent regions having wavelength selectivity propagate the second light beam and specific one light beam and do not propagate the first light beam, and either one of the first and second light beams is not propagated at a region other than the first to fourth transparent regions having wavelength selectivity.

An embodiment of the present invention is characterized in that the inner diameter of the first phase correcting zone is set to be approximately φ1×0.85.

An embodiment of the present invention is characterized in that the inner diameter of φ3 of the second phase correcting zone is set to be approximately φ2×0.85.

An embodiment of the present invention is characterized in that each phase correcting zone is formed using a diffraction optical region exhibiting a pseudo-kinoform shape having stepped structures with two or more steps in cross section.

An embodiment of the present invention is characterized in that each phase correcting zone is formed using a diffraction optical region exhibiting a pseudo-kinoform shape having stepped structures in cross section, a height h of steps of the stepped structures is set such that $\psi=2\pi(n-1)h/\lambda 0$, where $\lambda 0$ is the wavelength of the specific one light beam, n is a refractive index of the diffraction optical region with respect to the wavelength $\lambda 0$, and $\psi$ is a phase shift for the specific one light beam corresponding to one of the steps, becomes an integer multiple of $2\pi$.

An embodiment of the present invention is characterized in that the phase correcting means and light beam restriction means are integrated into one piece by forming the phase correcting means and light beam restriction means on two sides of a common substrate or bonding the phase correcting means and light beam restriction means together.

An embodiment of the present invention is characterized in that a holding mechanism for the objective lens is caused to hold the phase correcting means together with the objective lens.

An embodiment of the present invention is characterized in that a holding mechanism for the objective lens is caused to hold the light beam restriction means and phase correcting means together with the objective lens.

According to the present invention, a common objective lens and common phase correcting means make it possible to correct the spherical aberration to each of light beams having two or more wavelengths by a parallel light beam, prevent exacerbation of spherical aberration during tracking of the objective lens without needing any finite optical system, and secure the flexibility in configuring an optical system.

According to another invention, if an objective lens commonly used for three light beams having wavelengths different from one another is formed such that the wave front aberration to a specific one of the light beams as a parallel light beam is minimum on a corresponding optical recording medium, it is possible to correct the spherical aberration to each of the light beams except for the specific one light beam, the two light beams by common phase correcting means, prevent exacerbation of spherical aberration during tracking of the objective lens without needing any finite optical system, and secure the flexibility in configuring an optical system.

A phase correcting zone corresponding to a part whose diameter falls within the range of 1φ (where φ is a diameter as the light beam diameter of a light beam to be phase-corrected) to approximately 0.85φ is provided in the phase correcting means. With this configuration, good point image light intensity distribution is achieved.

Two or more such phase correcting zones are concentrically provided for each of the light beams to be phase-corrected. With this configuration, good point image light intensity distribution free of side lobes is achieved.

Each phase correcting zone of the phase correcting means is configured to be a diffraction optical region exhibiting a kinoform shape or a pseudo-kinoform shape having stepped structures with two or more steps in cross section. This configuration makes it possible to select a wavelength and correct aberration and control the diffraction efficiency using the number of steps of each stepped structure.

If the phase correcting means is desired to perform phase correction on the two light beams and propagate the specific one light beam without performing phase correction and changing its parallel light beam state, each phase correcting zone of the phase correcting means is formed using a diffraction optical region exhibiting a pseudo-kinoform shape having stepped structures in cross section, and a height h of steps of the stepped structures is set such that $\psi=2\pi(n-1)h/\lambda 0$, where $\lambda 0$ is the wavelength of the specific one light beam not to be phase-corrected, n is a refractive index of the diffraction optical region with respect to the wavelength $\lambda 0$, and $\psi$ is a phase shift for the specific one light beam corresponding to one of the steps, becomes an integer multiple of $2\pi$. This configuration keeps an equiphase wave surface in a good planar state even if the specific one light beam passes through the phase correcting zones and makes it possible to prevent a phase shift from occurring in the specific one light beam without affecting phase correction on the light beams except for the specific one.

BEST MODES FOR CARRYING OUT THE INVENTION

Figure 1:
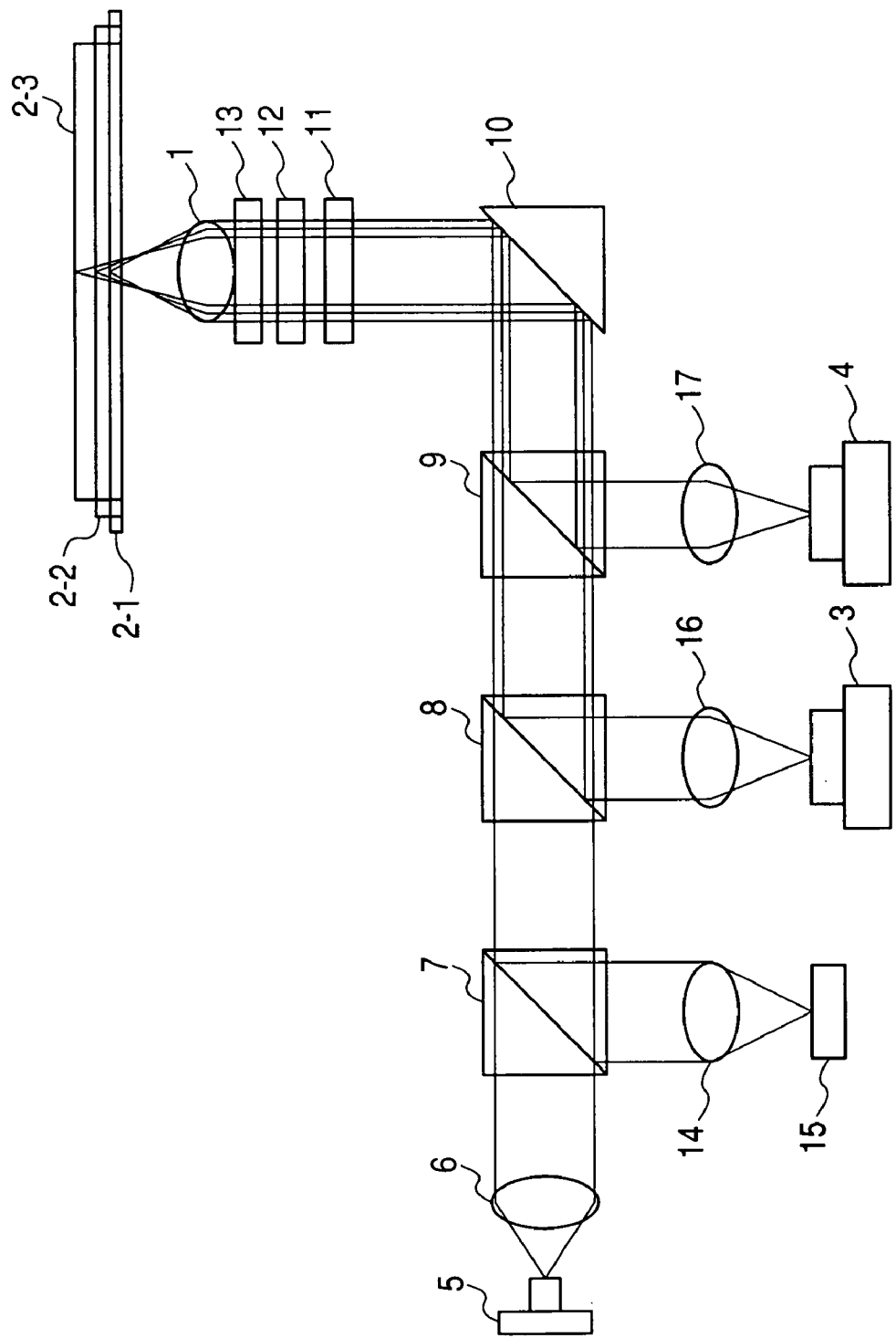
FIG. 1 is a view of the configuration of an optical system of a conventional optical pickup.

In the case of an optical pickup device which supports three optical recording media, a next generation DVD having a used wavelength $\lambda 0$ of 405 nm, a numerical aperture of 0.85, and a signal plane protecting substrate thickness of 0.1 mm, a DVD having a used wavelength $\lambda 1$ of 650 nm, a numerical aperture of 0.6, and a signal plane protecting substrate thickness of 0.6 mm, and a CD having a used wavelength $\lambda 2$ of 780 nm, a numerical aperture of 0.45, and a signal plane protecting substrate thickness of 1.2 mm, assuming that light beam diameters commensurate with the numerical apertures for the next generation DVD, DVD, and CD are $\phi 0$, $\phi 1$, and $\phi 2$, respectively, the relation $\phi 0 > \phi 1 > \phi 2$ holds. The optical pickup device radiates three light beams having the wavelength $\lambda 0$ of 405 nm, the wavelength $\lambda 1$ of 650 nm, and the wavelength $\lambda 2$ of 780 nm, transforms the light beams into parallel light beams by an optical system such that their axes coincide with a light axis, and guides the resultant light beams to a common objective lens through a light beam limiting element and a phase correcting element which are located backward and forward. The light beam limiting element and phase correcting element are arranged to be perpendicular to the light axis and are formed to be larger than a circular zone which is centered on the light axis and has a diameter of $\phi 0$. The objective lens is designed such that wave front aberration is minimum on the signal plane of the next generation DVD when a light beam as a parallel light beam having the wavelength $\lambda 0$ for the next generation DVD comes incident. The phase correcting element allows a light beam as a parallel light beam having the wavelength $\lambda 0$ to pass therethrough without changing its parallel light beam state (with an equiphase wave surface kept planar), performs, on a light beam having the wavelength $\lambda 1$, phase correction for ameliorating spherical aberration on the signal plane of the DVD to the fullest extent, and performs, on a light beam having the wavelength $\lambda 2$, phase correction for ameliorating spherical aberration on the signal plane of the CD to the fullest extent.

A toric zone which is centered on the light axis of the phase correcting element and has an outer diameter of $\phi 0$ and an inner diameter of $\phi 1$ is a zone transparent to a light beam having the wavelength $\lambda 0$ for the next generation DVD (no phase difference occurs in a cross section of the light beam perpendicular to the light axis). A toric zone which is centered on the light axis of the phase correcting element and has an outer diameter of $\phi 1$ and an inner diameter of $\phi 2$ is a first phase correcting zone and performs phase correction for correcting spherical aberration on a light beam having the wavelength $\lambda 1$ for the DVD. A toric zone which is centered on the light axis of the phase correcting element and has an outer diameter of $\phi 2$ and an inner diameter of $\phi 3$ smaller than $\phi 2$ and larger than 0 is a second phase correcting zone and performs phase correction for correcting spherical aberration on a light beam having the wavelength $\lambda 2$ for the CD. A toric zone which is centered on the light axis of the phase correcting element and has an outer diameter of $\phi 3$ and an inner diameter of $\phi 4$ smaller than $\phi 3$ and larger than 0 is a third phase correcting zone and performs phase correction for correcting spherical aberration on a light beam having the wavelength $\lambda 1$ for the DVD. A disciform zone which has an outer diameter of $\phi 4$ is a fourth phase correcting zone and performs phase correction for correcting spherical aberration on a light beam having the wavelength $\lambda 2$ for the CD. Phase correction on each of light beams having the wavelengths $\lambda 1$ and $\lambda 2$ to be phase-corrected both on the periphery and near the center of a cross section of the light beam makes it possible to prevent an increase of side lobes in point image light intensity distribution caused by a super-resolution effect. It is preferable in terms of causing point image light intensity distribution on the DVD of a light beam for the DVD to have desired properties to set the inner diameter of the first phase correcting zone to about $0.85 \times \phi 1$. Similarly, it is preferable in terms of causing point image light intensity distribution on the CD of a light beam for the CD to have desired properties to set the inner diameter of the second phase correcting zone to about $0.85 \times \phi 2$.

A phase correcting element having good diffraction efficiency can be acquired by configuring each phase correcting zone to be a diffraction optical zone exhibiting a kinoform shape in cross section. Assume that the phase correcting element is formed using diffraction optical zones, each exhibiting a pseudo-kinoform shape having stepped structures with two or more steps in cross section, in terms of manufacturability. In this case, settings made such that $\psi = 2\pi(n-1)h/\lambda 0$, where n is the refractive index of a material for the phase correcting zones with respect to the wavelength $\lambda 0$ for the next generation DVD not to be phase-corrected, and $\psi$ is a phase shift corresponding to one step, becomes an integer multiple of $2\pi$ keep an equiphase wave surface in a good planar state even if a light beam for the next generation DVD passes through the phase correcting zones and prevent exacerbation of wave front aberration on the signal plane of the next generation DVD.

The light beam limiting element allows a light beam having the wavelength $\lambda 0$ to pass through all of ranges whose light beam diameters centered on the light axis are not more than $\phi 0$ and blocks the light beam from passing through the remaining range. The light beam limiting element has provided therein first to fourth transparent regions having wavelength selectivity which have the same shapes and sizes as the first to fourth phase correcting zones of the phase correcting element. The center of each of the first to fourth transparent regions having wavelength selectivity coincides with the light axis. The first to fourth phase correcting zones correspond to the first to fourth transparent regions having wavelength selectivity. A light beam having the wavelength $\lambda 1$ passes only through the first and third transparent regions having wavelength selectivity and does not pass through the remaining zone. That is, a light beam having the wavelength $\lambda 1$ passes only through a range whose light beam diameter is not more than $\phi 1$ and not less than $\phi 2$ and a range whose light beam diameter is not more than $\phi 3$ and not less than $\phi 4$. A component of the light beam passing through the former range comes incident on the first phase correcting zone of the phase correcting element while a component of the light beam passing through the latter range comes incident on the third phase correcting zone. A light beam having the wavelength $\lambda 2$ passes only through the second and fourth transparent regions having wavelength selectivity and does not pass through the remaining zone. That is, a light beam having the wavelength $\lambda 2$ passes only through a range whose light beam diameter is not more than $\phi 2$ and not less than $\phi 3$ and a range whose light beam diameter is not more than $\phi 4$. A component of the light beam passing through the former range comes incident on the second phase correcting zone of the phase correcting element while a component of the light beam passing through the latter range comes incident on the fourth phase correcting zone. A light beam having the wavelength λ0 passes through all of the ranges including the first to fourth transparent regions having wavelength selectivity, whose light beam diameters are not more than φ0, and comes incident on the circular zone, which is centered on the light axis and has the diameter of φ0.

First Embodiment

Figure 2:
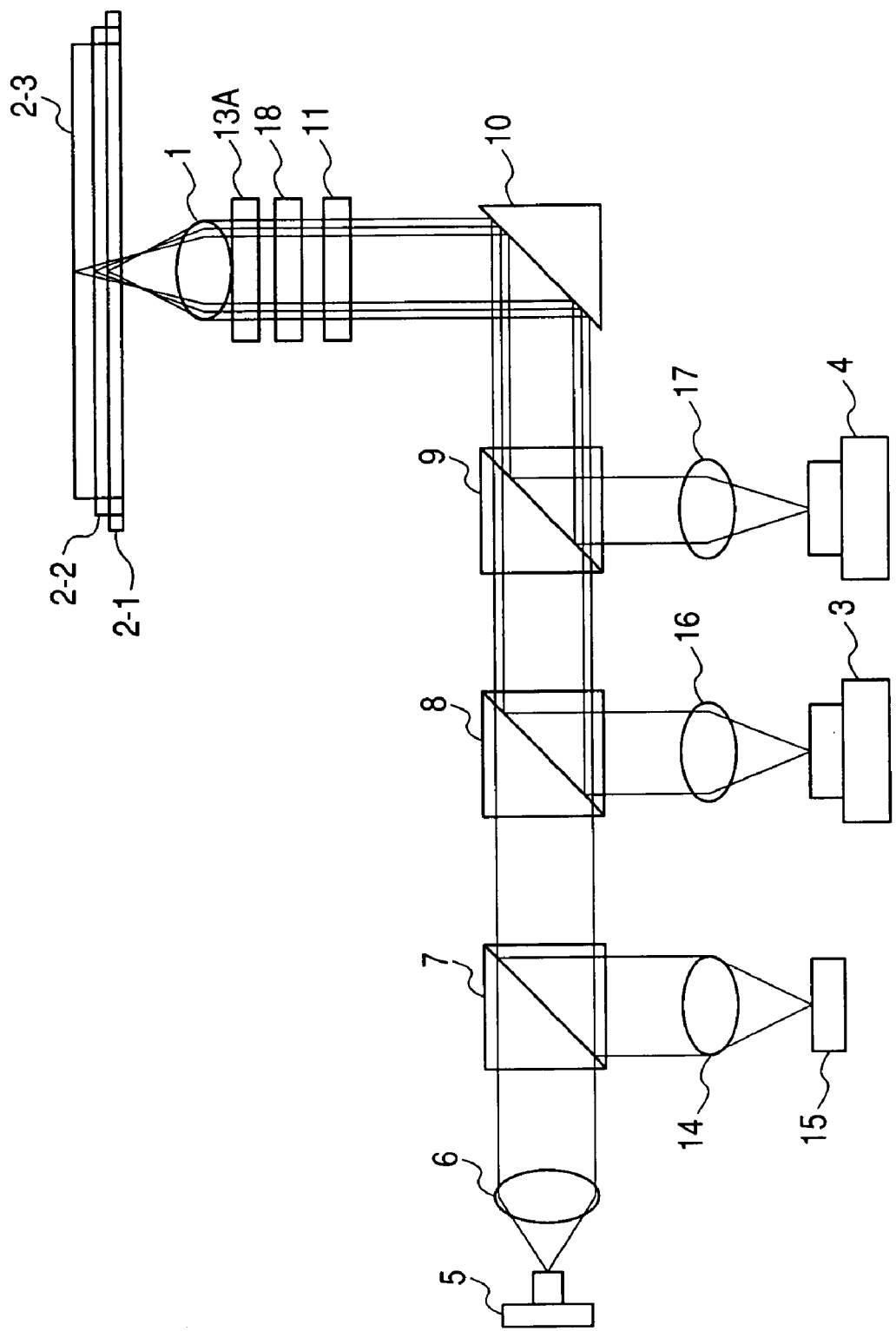
FIG. 2 is a view of the configuration of an optical system of an optical pickup for explaining the principle of the present invention.

FIG. 2 is a view of the configuration of an optical pickup device for explaining the principle of the present invention. The same components as those in FIG. 1 are denoted by the same reference numerals.

In FIG. 2, an objective lens 1 is designed such that the wave front aberration to light having a wavelength λ0 corresponding to a next generation DVD having a used wavelength λ0 of 405 nm, a NA of 0.85, and a signal plane protecting substrate thickness of 0.1 mm is minimum on the signal plane of a next generation DVD when the light is incident as a parallel light beam. A DVD hologram module 3 and a CD hologram module 4, in each of which light receiving and emitting units are packaged, are used as DVD and CD light sources. A light beam radiated from a next generation DVD semiconductor laser 5 is transformed into a parallel light beam by a collimator lens 6, passes through a deflection beam splitter 7 and DVD and CD dichroic prisms 8 and 9 for light beam separation, and changes its direction 90° by a prism 10. A wavelength plate 11 changes the state of polarization of the light beam from linear polarization into circular polarization, and a light beam limiting element restricts the diameter of the light beam to a light beam diameter (φ0) commensurate with the NA for the next generation DVD. The light beam passes through a phase correcting element 13A without changing its parallel light beam state (with an equiphase wave surface kept planar), comes incident on the objective lens 1, and is focused on the signal plane of an optical recording medium (next generation DVD) 2-1, thereby recording and/or playing back information. A light beam reflected from the optical recording medium 2-1 is transformed into a circularly polarized light beam having an opposite rotational direction and is transformed into a parallel light beam by the objective lens 1. The wavelength plate 11 changes the state of polarization of the light beam from circular polarization into linear polarization such that the resultant linearly polarized light beam is orthogonal to the original linearly polarized light beam. The light beam changes its direction 90° by the prism 10, is reflected by the deflection beam splitter 7, and is focused on a light receiving element 15 by a detecting lens 14. A light beam having a wavelength λ1 of 650 nm radiated from the DVD hologram module 3 is transformed into a parallel light beam by a coupling lens 16, is reflected by the dichroic prism 8, passes through the deflection beam splitter 7, and changes its direction 90° by the prism 10. The wavelength plate 11 changes the state of polarization of the light beam from linear polarization into circular polarization. The light beam limiting element 18 restricts the diameter of the light beam to a light beam diameter (φ1) commensurate with the NA for a DVD and restricts the light beam to parts corresponding to cross sections of light beam components incident on toric first and third phase correcting zones (to be described later) provided in the phase correcting element 13A. The phase correcting element 13A corrects the spherical aberration to the light beam. The light beam comes incident on the objective lens 1 and is focused on the signal plane of an optical recording medium (DVD) 2-2, thereby recording and/or playing back information. A light beam reflected from the optical recording medium 2-2 is transformed into a circularly polarized light beam having an opposite rotational direction and is transformed into a parallel light beam by the objective lens 1 and phase correcting element 13A. The wavelength plate 11 changes the state of polarization of the light beam from circular polarization into linear polarization such that the resultant linearly polarized light beam is orthogonal to the original linearly polarized light beam. The light beam changes its direction 90° by the prism 10, is reflected by the dichroic prism 8, and is focused on a light receiving element of the DVD hologram module 3 by the coupling lens 16. A light beam having a wavelength λ2 of 705 nm radiated from the CD hologram module 4 is transformed into a parallel light beam by a coupling lens 17, is reflected by the dichroic prism 9, and changes its direction 90° by the prism 10. The wavelength plate 11 changes the state of polarization from linear polarization into circular polarization. The light beam limiting element 18 restricts the diameter of the light beam to a light beam diameter (φ2) commensurate with the NA for a CD and restricts the light beam to parts corresponding to cross sections of light beam components incident on toric second and disciform fourth phase correcting zones (to be described later) provided in the phase correcting element 13A. The phase correcting element 13A corrects the spherical aberration to the light beam. The light beam comes incident on the objective lens 1 and is focused on the signal plane of an optical recording medium (CD) 2-3, thereby recording and/or playing back information. A light beam reflected from the optical recording medium 2-3 is transformed into a circularly polarized light beam having an opposite rotational direction and is transformed into a parallel light beam by the objective lens 1 and phase correcting element 13A. The wavelength plate 11 changes the state of polarization of the light beam from circular polarization into linear polarization such that the resultant linearly polarized light beam is orthogonal to the original linearly polarized light beam. The light beam changes its direction 90° by the prism 10, is reflected by the dichroic prism 9, and is focused on a light receiving element of the CD hologram module 4 by the coupling lens 17. Assume here that specific values represented by φ0 to φ2 are 3.1 mm, 2.2 mm, and 1.8 mm, respectively.

Figure 3:
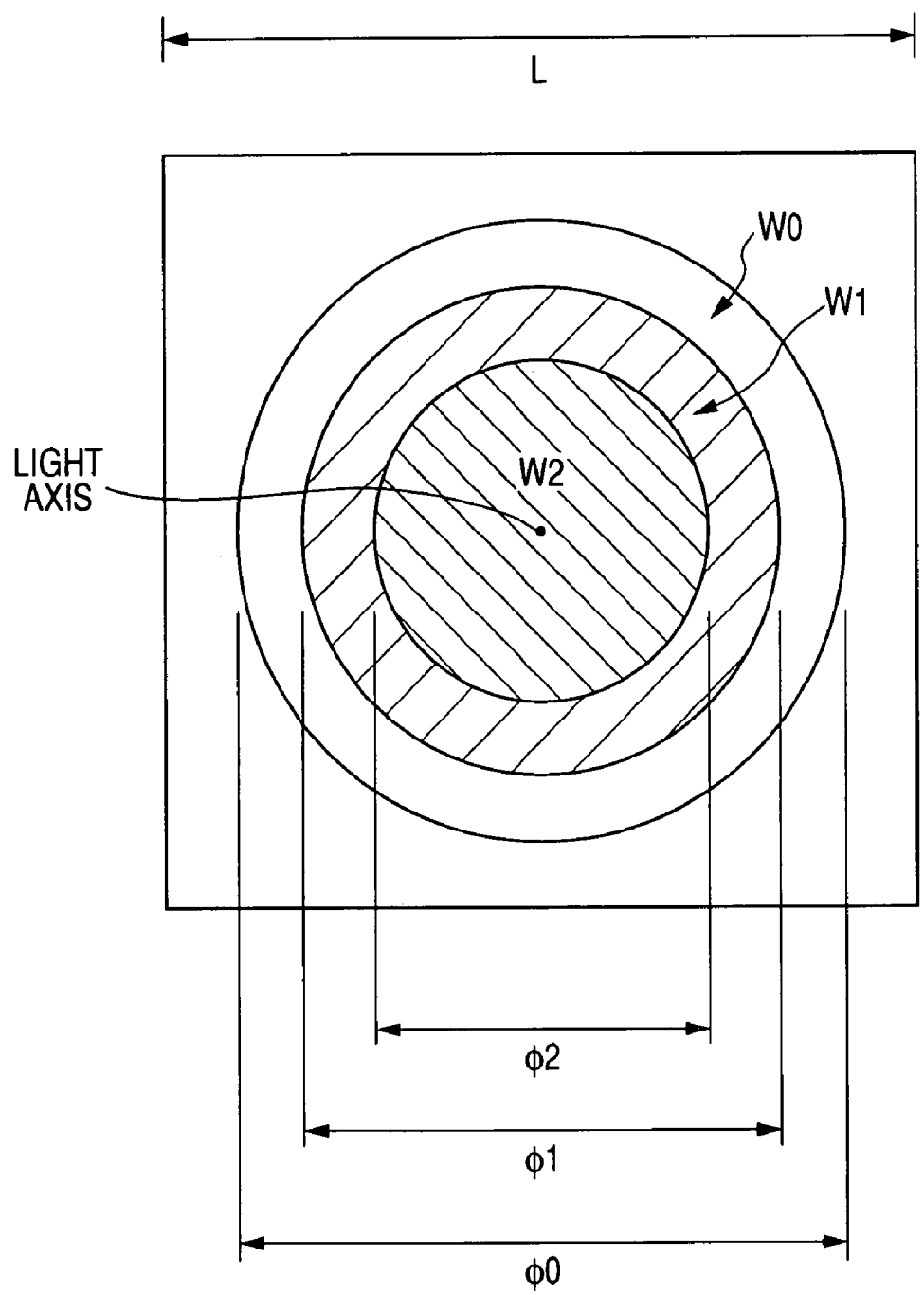
FIG. 3 is a plan view of a phase correcting element in FIG. 2.

The light beam limiting element 18 and phase correcting element 13A are located backward and forward such that the phase correcting element 13A is nearer the objective lens in relation to the light beam limiting element 18. Of these components, the phase correcting element 13A is arranged to be perpendicular to the light axis of the objective lens 1, and parallel light beams having the wavelengths of λ0, λ1, and λ2 for the next generation DVD, DVD, and CD perpendicularly come incident on the phase correcting element 13A. The phase correcting element 13A is formed in the shape of a square plate, and FIG. 3 shows a plan view of the phase correcting element 13A as seen from a direction of the light axis. The phase correcting element 13A is formed such that an external size L is larger than the diameter of a circular region, φ0. Assume here that L is, for example, 3.8 mm. The phase correcting element 13A has thereinside a toric first phase correcting zone (W1) which is centered on the light axis and has an outer diameter of φ1 and an inner diameter of φ2 and a disciform second phase correcting zone (W2) which is centered on the light axis and has an outer diameter of φ2. Reference characters φ0, φ1, and φ2 denote values for light beam diameters commensurate with the Nas: NA0, NA1, and NA2, for the next generation DVD, DVD, and CD, and the relation φ0>φ1>φ2 holds. The first phase correcting zone W1 corrects the spherical aberration to a light beam for the DVD by phase correction while the second phase correcting zone W2 corrects the spherical aberration to a light beam for the CD by phase correction. A toric zone (W0) which is centered on the light axis and has an outer diameter of φ0 and an inner diameter of φ1 is a transparent region and allows a light beam having the wavelength λ0 corresponding to the next generation DVD to pass therethrough without changing its parallel light beam state (with an equiphase wave surface kept planar).

Figure 4:
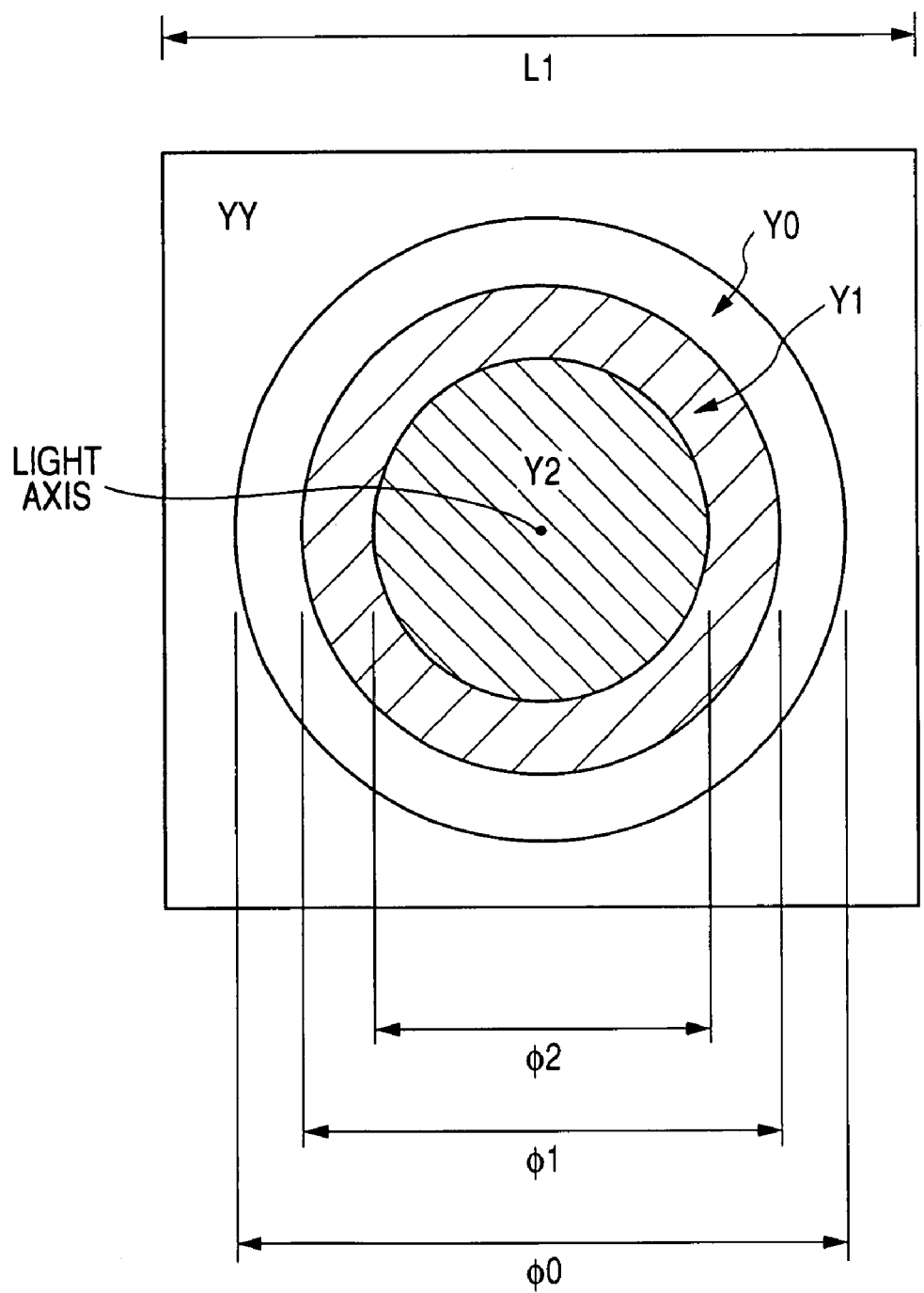
FIG. 4 is a plan view of a light beam limiting element in FIG. 2.
Figure 5:
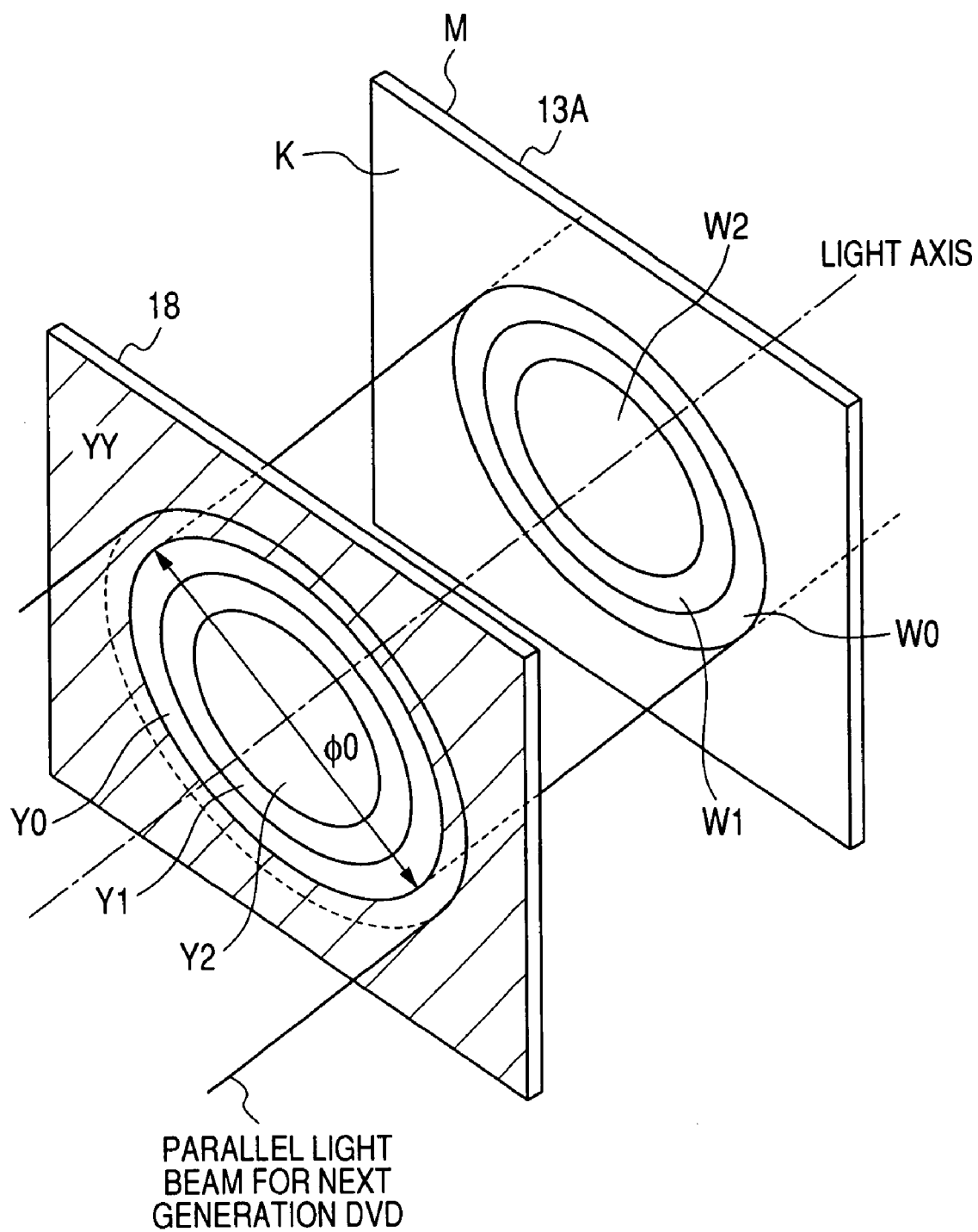
FIG. 5 is a perspective view for explaining the action of the light beam limiting element when a light beam for a next generation DVD comes incident.
Figure 6:
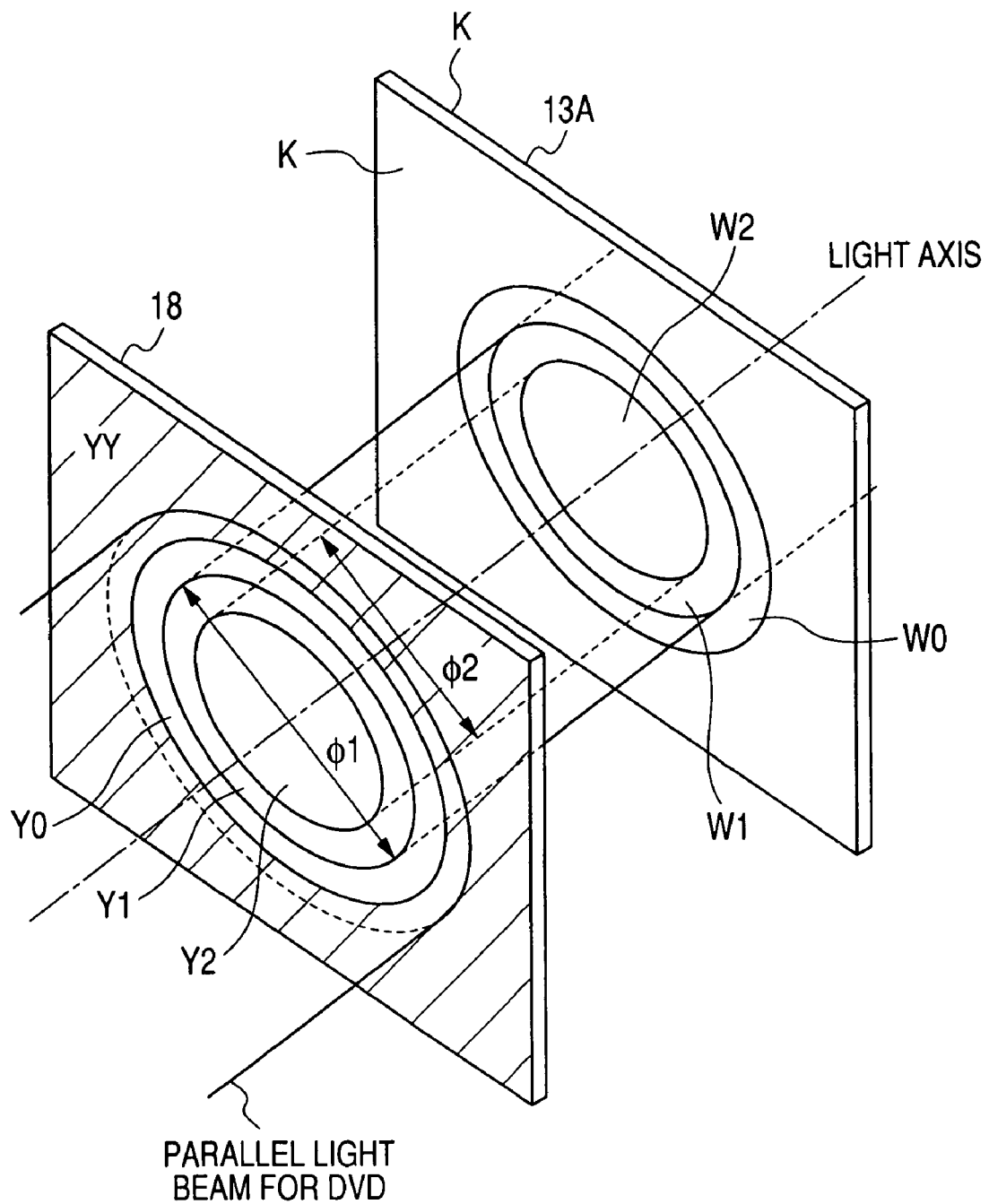
FIG. 6 is a perspective view for explaining the action of the light beam limiting element when a light beam for a DVD comes incident.
Figure 7:
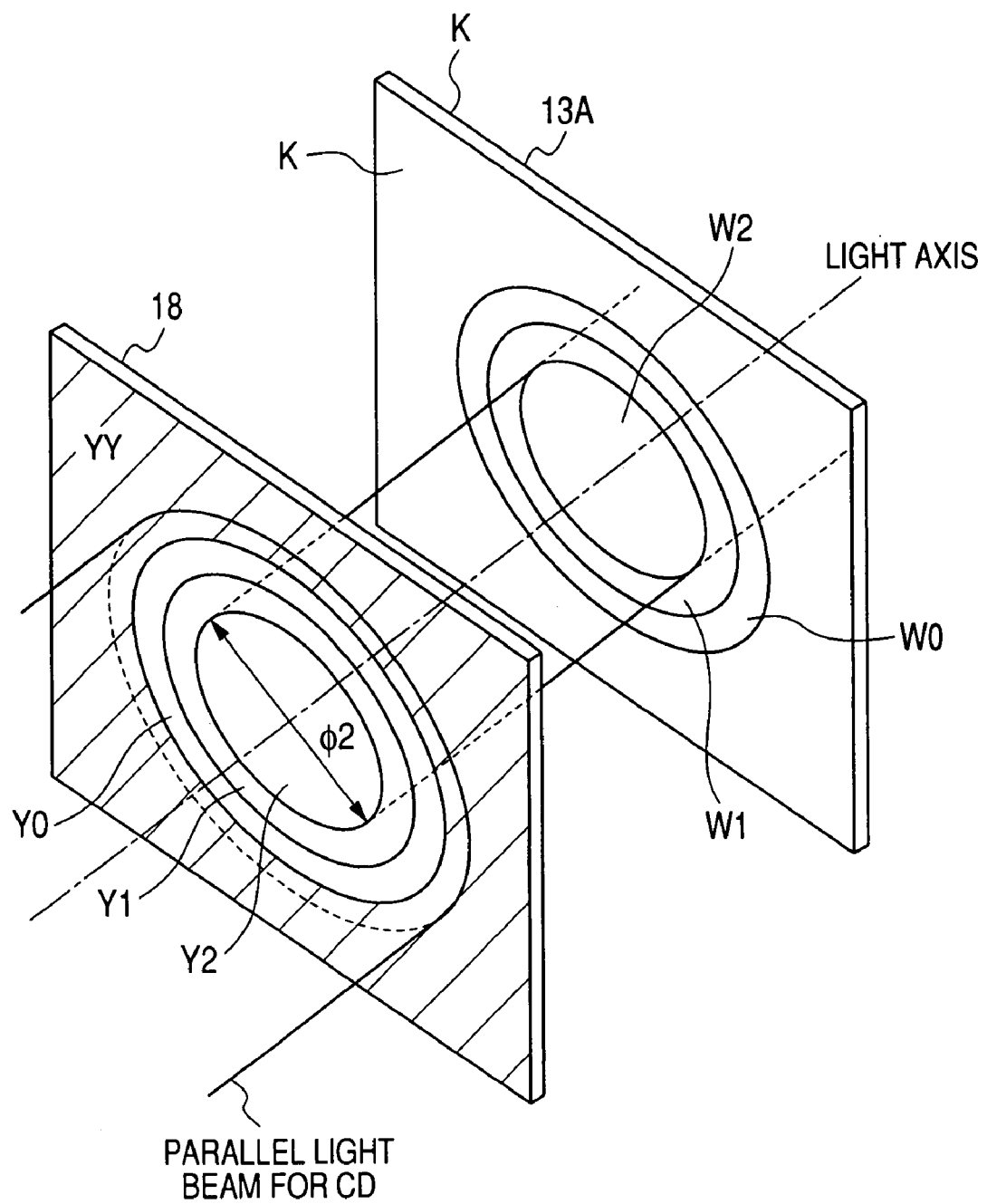
FIG. 7 is a perspective view for explaining the action of the light beam limiting element when a light beam for a CD comes incident.

The light beam limiting element 18 is also formed in the shape of a square plate and is arranged to be perpendicular to the light axis of the objective lens 1. Parallel light beams having the wavelengths of λ0, λ1, and λ2 for the next generation DVD, DVD, and CD perpendicularly come incident on the light beam limiting element 18. FIG. 4 shows a plan view of the light beam limiting element 18 as seen from the direction of the light axis. The light beam limiting element 18 is formed such that an external size L1 is larger than any one of the light beam diameters of parallel light beams having the wavelengths of λ0, λ1, and λ2 for the next generation DVD, DVD, and CD. Assume here that L1 is, for example, 3.8 mm. The light beam limiting element 18 has thereinside first and second transparent regions Y1 and Y2 having wavelength selectivity which are centered on the light axis and have the same shapes and sizes as the first and second phase correcting zones W1 and W2 of the phase correcting element 13A and a toric outer transparent region Y0 having wavelength selectivity which has an outer diameter of φ0 and an inner diameter of φ1. Outside the outer transparent region Y0 having wavelength selectivity is a blocking zone YY, which blocks any one of light beams having the wavelengths of λ0, λ1, and λ2 for the next generation DVD, DVD, and CD. The outer transparent region YY having wavelength selectivity allows the wavelength λ0 for the next generation DVD to pass therethrough and blocks the wavelengths of λ1 and λ2 for the DVD and CD. The first transparent region Y1 having wavelength selectivity allows the wavelengths of λ0 and λ1 for the next generation DVD and DVD to pass therethrough and blocks the wavelength λ2 for the CD. The second transparent region Y2 having wavelength selectivity allows the wavelengths of λ0 and λ2 for the next generation DVD and CD to pass therethrough and blocks the wavelength λ1 for the DVD. For this reason, the wavelength λ0 for the next generation DVD is limited to within a range which has a light beam diameter of φ0 centered on the light axis and comes incident on the first and second phase correcting zones W1 and W2 and zone W0 of the phase correcting element 13A (see FIG. 5). The wavelength λ1 for the DVD is limited to within a range which has a light beam diameter of φ1 centered on the light axis, is also limited to a part whose diameter falls within the range of φ1 to φ2, and comes incident on the first phase correcting zone W1 of the phase correcting element 13A (see FIG. 6). The wavelength λ2 for the CD is limited to a range which has a light beam diameter of φ2 centered on the light axis and comes incident on the second phase correcting zone W2 of the phase correcting element 13A (see FIG. 7).

Referring back to FIG. 3, the phase correcting zones W1 and W2 are each a diffraction optical zone exhibiting a pseudo-kinoform shape having stepped structures with two or more steps. The configuration of each diffraction optical zone exhibiting the pseudo-kinoform shape will now be described. Let r be the distance from the light axis measured in a direction perpendicular to the light axis, and λ be a used wavelength. An optical path difference function Φ(r) defined by the formula below which gives a phase shift for correcting spherical aberration for each of the DVD and CD is determined by the spherical aberration with respect to the distance r from the light axis for the DVD or CD. Since spherical aberration varies with the distance r from the light axis, a phase difference which causes spherical aberration can be corrected by varying a phase shift for correcting spherical aberration according to the distance r.

$$\Phi(r) = (m\lambda/2\pi) \times (a_1 r^2 + a_2 r^4 + a_3 r^6 + \ldots) \quad (1)$$

where λ is a wavelength to be corrected, the zone W1 is intended for the DVD, the zone W2 is intended for the CD, m is a specific diffraction order used which generally has a value of −1 or +1, and $a_1, a_2, a_3, \ldots$ are each a predetermined optical path difference coefficient determined by the configuration of an optical system.

Figure 8:
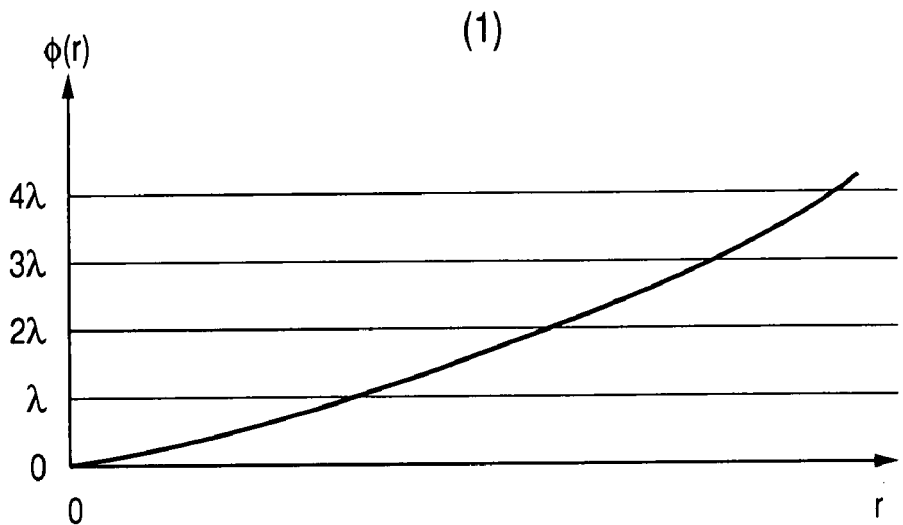
FIG. 8 shows charts for explaining a method for configuring phase correcting zones of the phase correcting element in FIG. 2.
Figure 8:
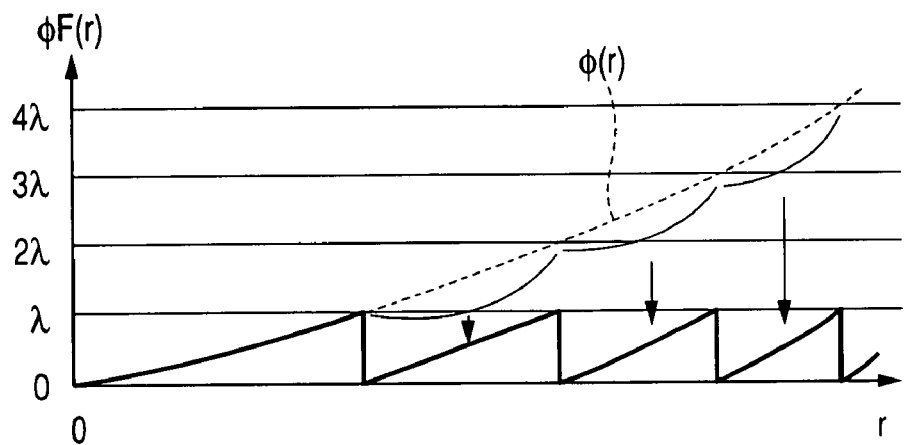
Figure 8:
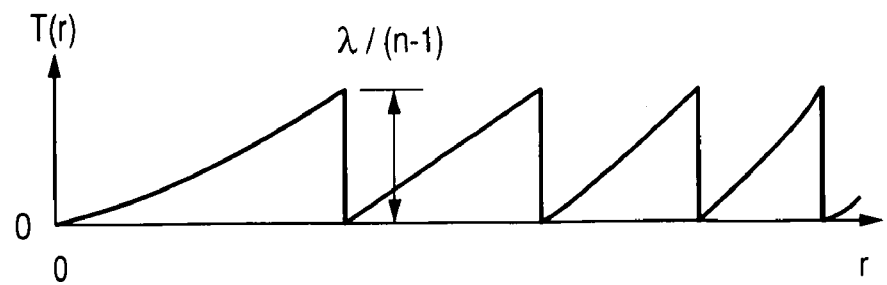

The optical path difference function Φ(r) is as shown in, e.g., FIG. 8(1). Even if an integer multiple of the wavelength λ (in phasic terms, an integer multiple of 2π) is added to or subtracted from the optical path difference function, an optical path difference function equivalent thereto can be acquired. Accordingly, letting ΦF(r) be an optical path difference function obtained by transforming Φ(r) by adding an integer multiple of the wavelength λ to or subtracting it from Φ(r) such that the value of the optical path difference function falls within the range of 0 to λ, ΦF(r) is as shown in FIG. 8(2). To make ΦF(r) hold in the material for the phase correcting element 13A having a refractive index with respect to the wavelength λ, n(λ), it suffices to vary the thickness according to the following thickness distribution function T(r):

$$T(r) = \Phi F(r)/(n(\lambda) - 1) \quad (2)$$

(shown in FIG. 8(3)). If a structure represented by the formula (2) is formed on a substrate having a uniform thickness, the substrate has a diffraction optical structure having grooves concentrically formed around the light axis in which maximum depths D of the grooves are fixed at $\lambda/(n(\lambda)-1)$, and groove pitches P decrease with an increase of r. Generally, a light beam having the wavelength λ perpendicularly incident on the diffraction optical zones with the groove pitches P emits mth-order light at a diffraction angle θ (θ here is an angle measured in the direction of the light axis) defined by $\sin\theta = m\lambda/P$. A parallel light beam perpendicularly incident on the concentric diffraction optical zones with the groove pitches P, which gradually decrease from the inner circumferential side to the outer circumferential side, has a diffraction angle which gradually increases from the inner circumferential side to the outer circumferential side and thus emits a divergent light beam or convergent light beam. Accordingly, it is possible to treat the concentric diffraction optical zones with the continuously-varying groove pitches P as an optical element which bends the traveling direction of light like a lens.

Figure 9:
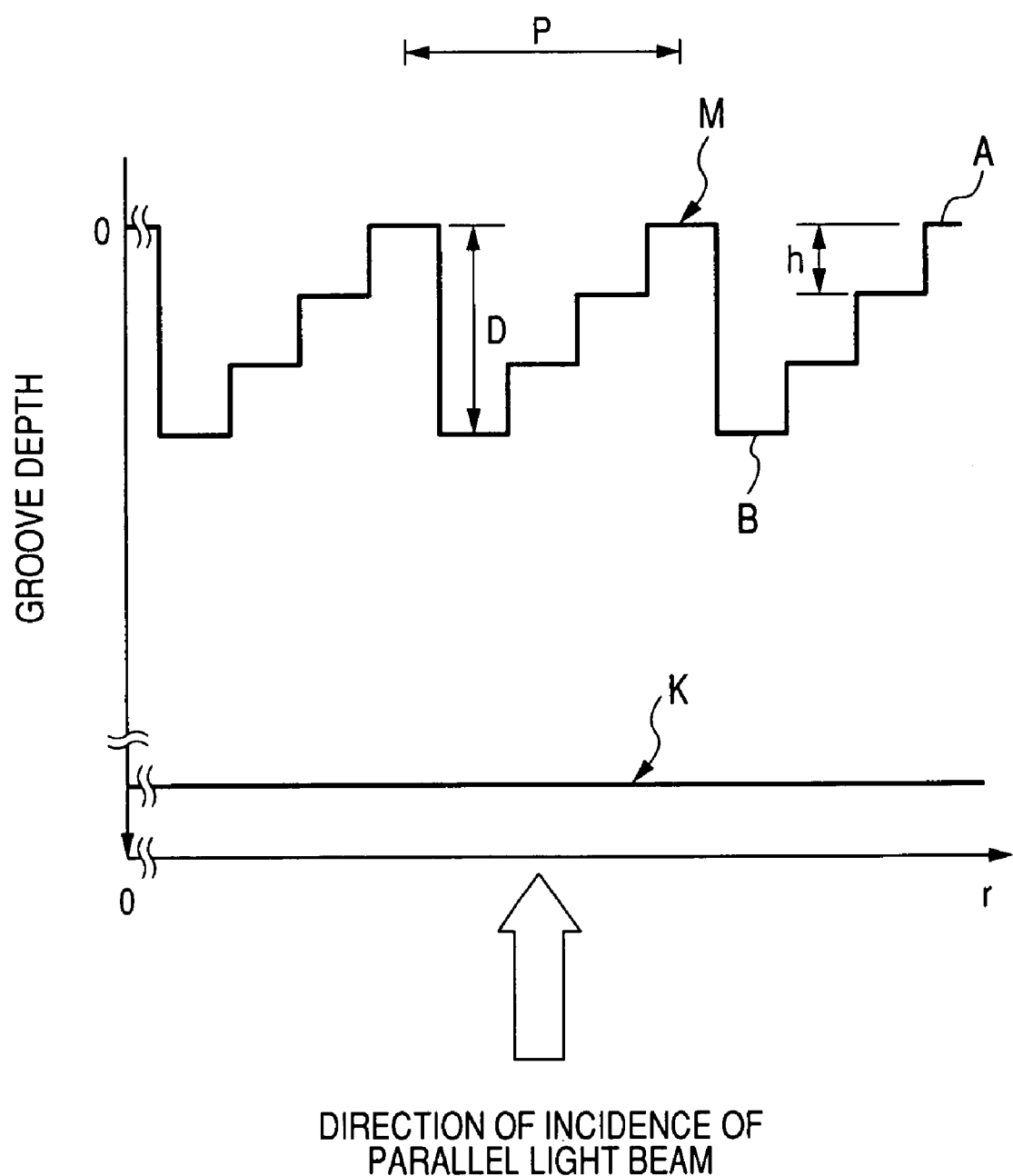
FIG. 9 is a chart for explaining the structure in cross section of the phase correcting zones of the phase correcting element in FIG. 2.

A diffraction optical structure which is saw-toothed in cross section, as shown in FIG. 8(3), is called a kinoform, and the diffraction efficiency of first-order light having a target wavelength is theoretically 100%. However, since it is difficult to manufacture a diffraction structure exhibiting a kinoform shape, a pseudo-kinoform shape having stepped structures with two or more steps in cross section which is made to resemble a kinoform shape, as shown in FIG. 9, is generally adopted. The diffraction efficiency is determined by the number of steps. The diffraction efficiency is 41% in the case of two steps, is 81% in the case of four steps, is 95% in the case of eight steps, and reaches 99% in the case of 16 steps. Note that if the maximum depths D of the grooves deviate from $\lambda/(n(\lambda)-1)$, the diffraction efficiency decreases. In FIGS. 5 to 7 and 9, reference characters K and M denote a front surface (a surface opposing the light beam limiting element 18) and a back surface (a surface opposing the objective lens 1) of the phase correcting element 13A. The stepped structures are formed on the back surface side, and a light beam as a parallel light beam comes incident from the front surface side.

A phase shift ψ between adjacent steps of each stepped structure is given by ψ=2π(n(λ)−1)h/λ, where λ is the wavelength of incident light, n is the refractive index of a material for the phase correcting element 13A with respect to the wavelength λ, and h is a step height. Accordingly, the step height designed such that ψ with respect to the wavelength λ becomes an integer multiple of 2π makes it possible to keep the equiphase wave surface of a parallel light beam having the wavelength λ which perpendicularly passes through the steps planar. In the case of the phase correcting element 13A, in the first phase correcting zone W1, the groove pitches P of the stepped structures are so set as to correct the spherical aberration to a light beam as a parallel light beam having the wavelength λ1 for the DVD, and it suffices to set the step height h of the stepped structures such that the phase shift ψ becomes an integer multiple of 2π with respect to the wavelength λ0 for the next generation DVD (although the maximum depth D of the grooves deviates from λ1/(n(λ1)−1), a decrease of diffraction efficiency can be suppressed by setting the number of steps and the height h such that the maximum depth D becomes close to an integer multiple of λ1/(n(λ1)−1)). Similarly, the second phase correcting zone W2 corrects spherical aberration to a light beam as a parallel light beam having the wavelength λ2 for the CD, and the step height h of the stepped structures is set such that the phase shift ψ becomes an integer multiple of 2π with respect to the wavelength λ0 for the next generation DVD (although the maximum depth D of the grooves deviates from λ2/(n(λ2)−1), a decrease of diffraction efficiency can be suppressed by setting the number of steps and the height h such that the maximum depth D becomes close to an integer multiple of λ2/(n(λ2)−1)). Note that the zone W0 does not have stepped structures in cross section, is made flush with the upper surface or bottom surface of the stepped structures of the first phase correcting zone W1 (see reference character A or B in FIG. 9), and the thickness of the phase correcting element 13A with the stepped structures excluded is made the same both in the zone W0 and in the first phase correcting zone W1. As a result, a light beam for the next generation DVD does not change its parallel light beam state in all of the zones W0 to W2 when it passes through the phase correcting element 13A.

If BK7 is used as an example of a glass material for the phase correcting element 13A including the phase correcting zones, n (λ0) is 1.530196, n (λ1) is 1.514520, and n (λ2) is 1.511183. If the first phase correcting zone W1 is configured to have a pseudo-kinoform shape, the number of steps may be set to 5; the step height h, 0.764 μm; and the maximum groove depth D, 3.819 μm, for example. If the second phase correcting zone W2 is configured to have a pseudo-kinoform shape, the number of steps may be set to 4; the step height h, 0.764 μm; and the maximum groove depth D, 3.055 μm, for example. The following description will be given on the assumption that the glass material for the phase correcting element 13A including the phase correcting zones is BK7, the number of steps of the first phase correcting zone W1 is 5, the step height h is 0.764 μm, the maximum groove depth D is 3.819 μm, the number of steps of the second phase correcting zone W2 is 4, the step height h is 0.764 μm, and the maximum groove depth D is 3.055 μm.

Figure 10:
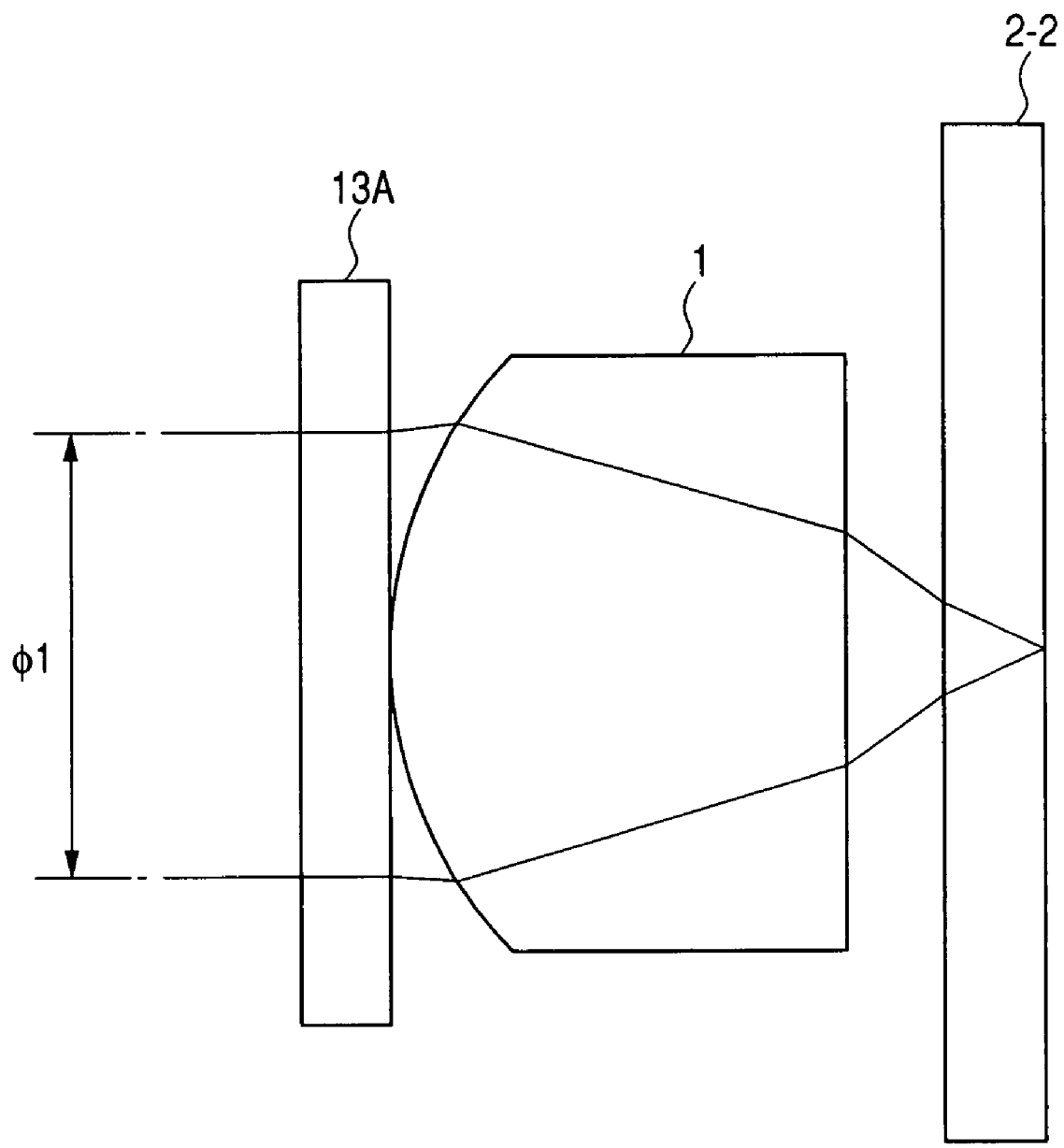
FIG. 10 is a view of an optical path when the phase correcting zones of the phase correcting element in FIG. 2 are formed for the DVD, and a light beam having a wavelength for the DVD is focused on the signal plane of the DVD.
Figure 11:
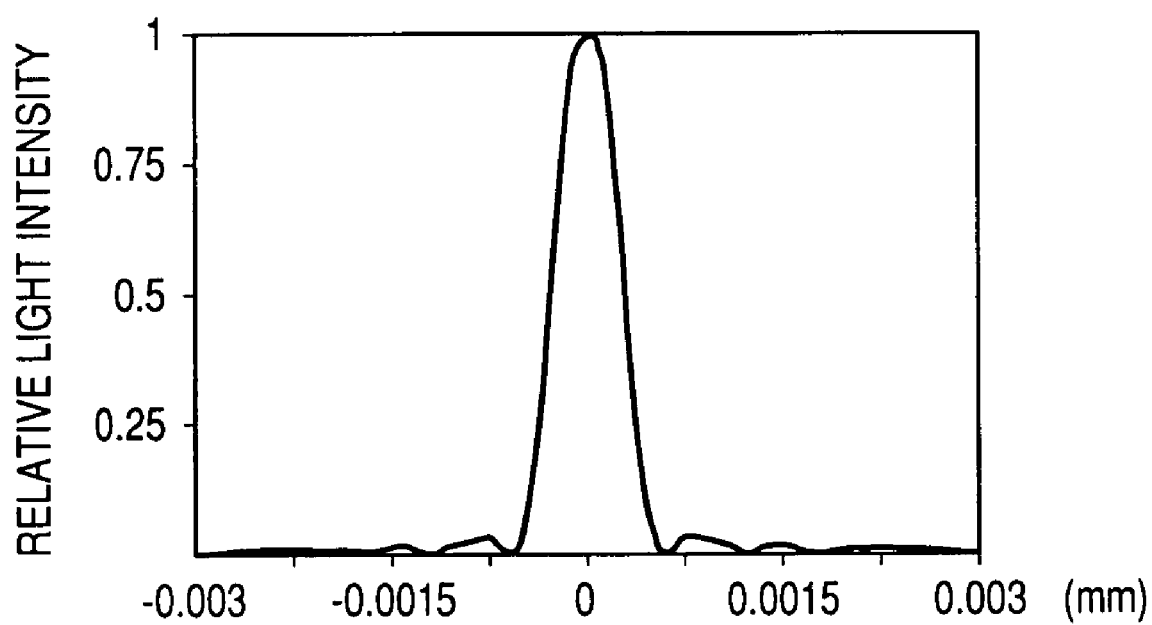
FIG. 11 is a point image light intensity distribution chart when the phase correcting zones of the phase correcting element in FIG. 2 are formed for the DVD, and the light beam having the wavelength for the DVD is focused on the signal plane of the DVD.
Figure 12:
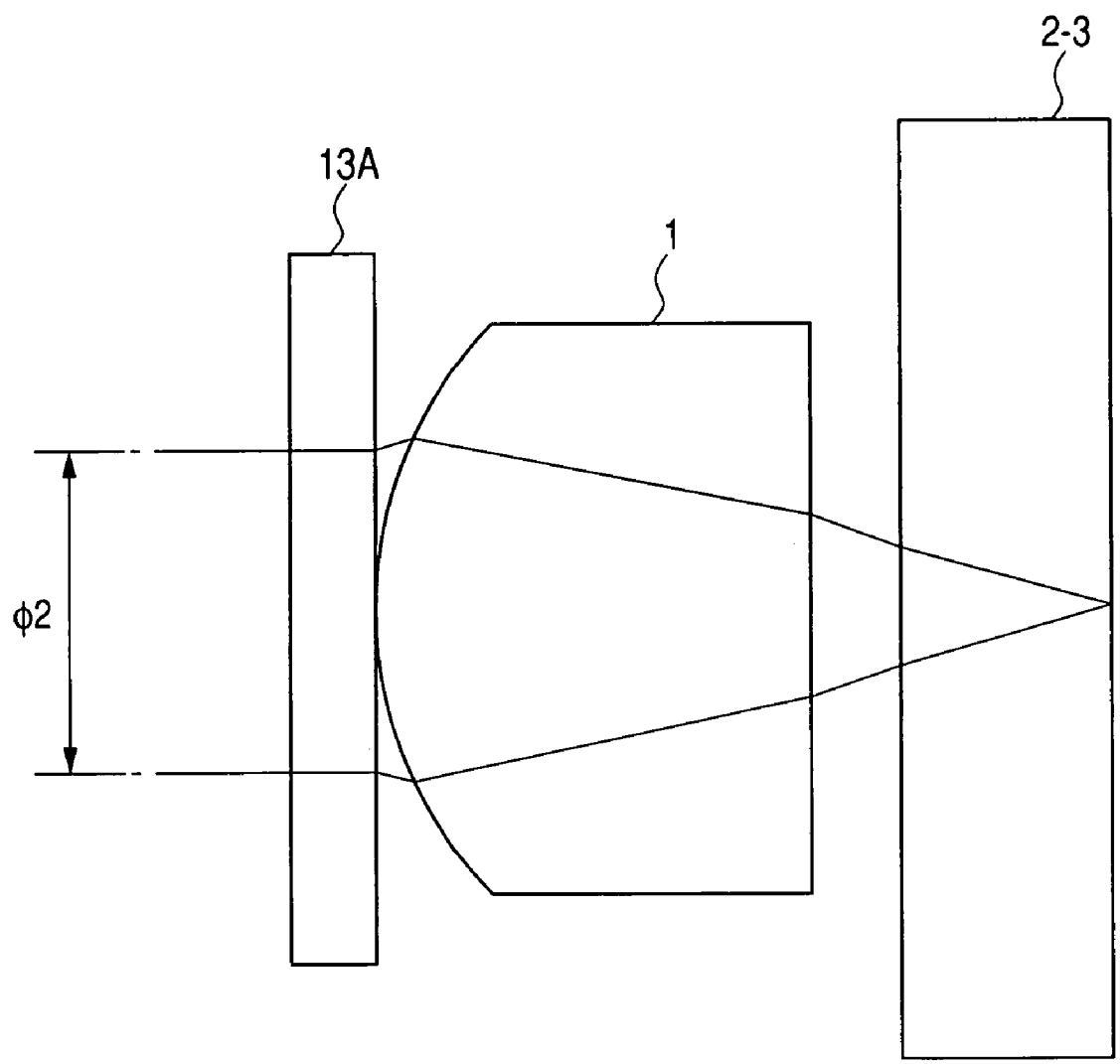
FIG. 12 is a view of an optical path when the phase correcting zones of the phase correcting element in FIG. 2 are formed for the CD, and a light beam having a wavelength for the CD is focused on the signal plane of the CD.
Figure 13:
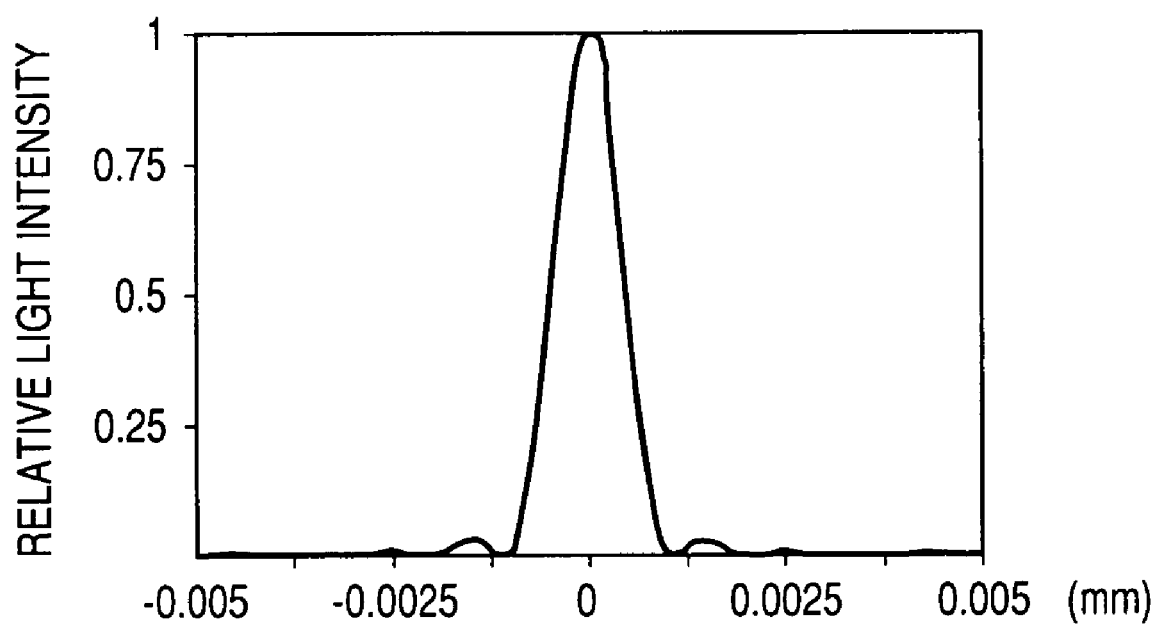
FIG. 13 is a point image light intensity distribution chart when the phase correcting zones of the phase correcting element in FIG. 2 are formed for the CD, and the light beam having the wavelength for the CD is focused on the signal plane of the CD.

Assume that the first phase correcting zone W1 is expanded to include the second phase correcting zone W2, and the first transparent region Y1 having wavelength selectivity of the light beam limiting element 18 is expanded correspondingly to include the second transparent region Y2 having wavelength selectivity, and all of ranges within which a diameter φ centered on the light axis of the phase correcting element 13A satisfies φ1≧φ are configured to have a pseudo-kinoform shape for correcting the spherical aberration to the wavelength λ1 for the DVD. In this case, the optical path and point image light intensity distribution when a light beam for the DVD is focused on the signal plane of the optical recording medium (DVD) 2-2 become as shown in FIGS. 10 and 11. It is clear from FIGS. 10 and 11 that the spherical aberration can be corrected. Similarly, assume that the second phase correcting zone W2 is expanded to include the first phase correcting zone W1, and the second transparent region Y2 having wavelength selectivity of the light beam limiting element 18 is expanded correspondingly to include the first transparent region Y1 having wavelength selectivity, and all of the ranges; within which the diameter φ centered on the light axis of the phase correcting element 13A satisfies φ2≧φ are configured to have a pseudo-kinoform shape for correcting the spherical aberration to the wavelength λ2 for the CD. In this case, the optical path and point image light intensity distribution when a light beam for the CD is focused on the signal plane of the optical recording medium (CD) 2-3 become as shown in FIGS. 12 and 13. It is clear from FIGS. 12 and 13 that the spherical aberration can be corrected. In the phase correcting element 13A in FIG. 3, a phase correcting zone is divided such that it can phase-correct both the wavelength λ1 for the DVD and the wavelength λ2 for the CD alone, and the first and second phase correcting zones W1 and W2 are provided exclusively for the wavelengths λ1 and λ2, respectively. In the light beam limiting element 18, the first and second transparent regions Y1 and Y2 having wavelength selectivity are provided corresponding to the first and second phase correcting zones W1 and W2.

Figure 14:
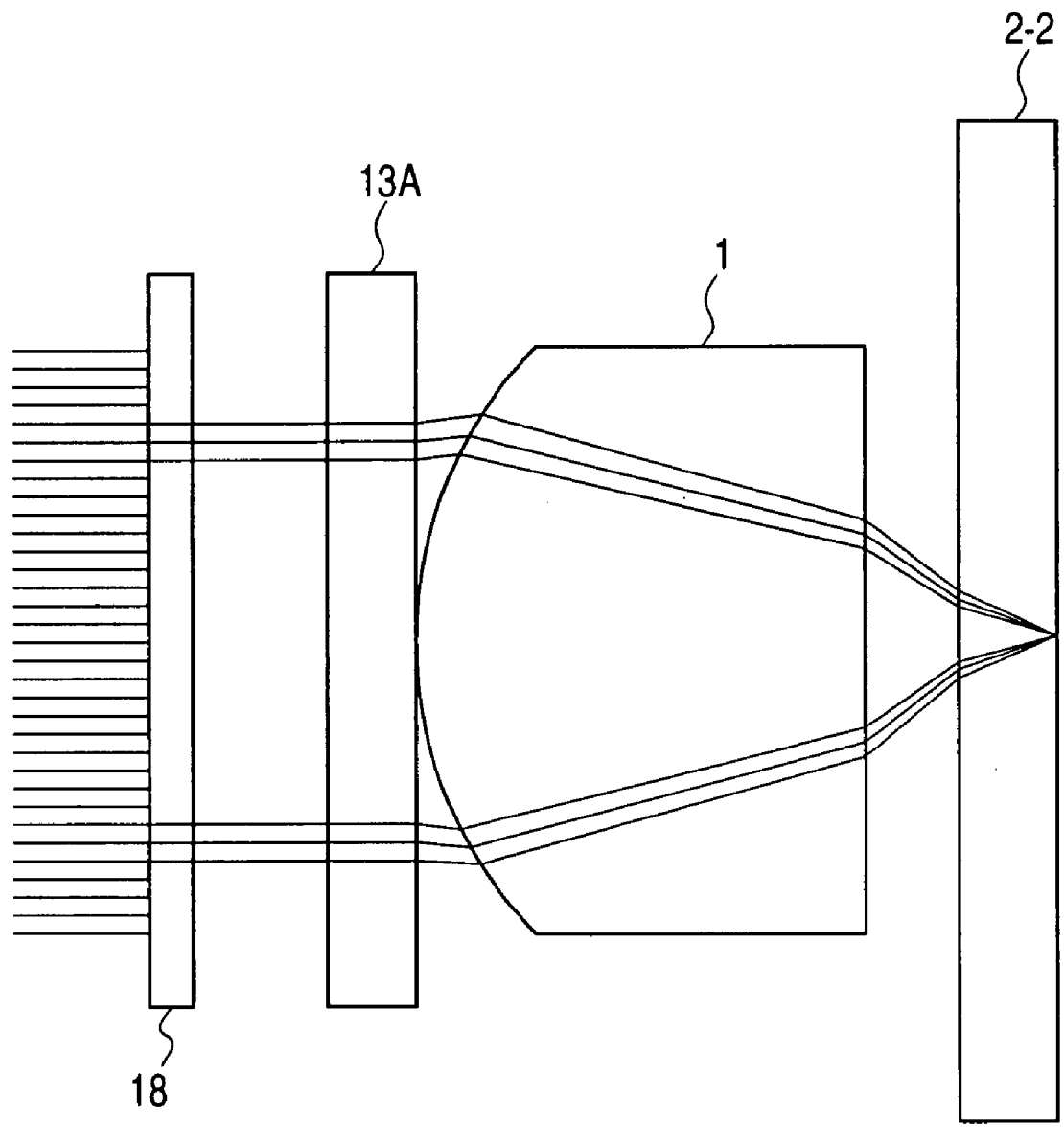
FIG. 14 is a view of an optical path when a light beam having the wavelength for the DVD is focused on the signal plane of the DVD by the optical pickup device in FIG. 2.
Figure 15:
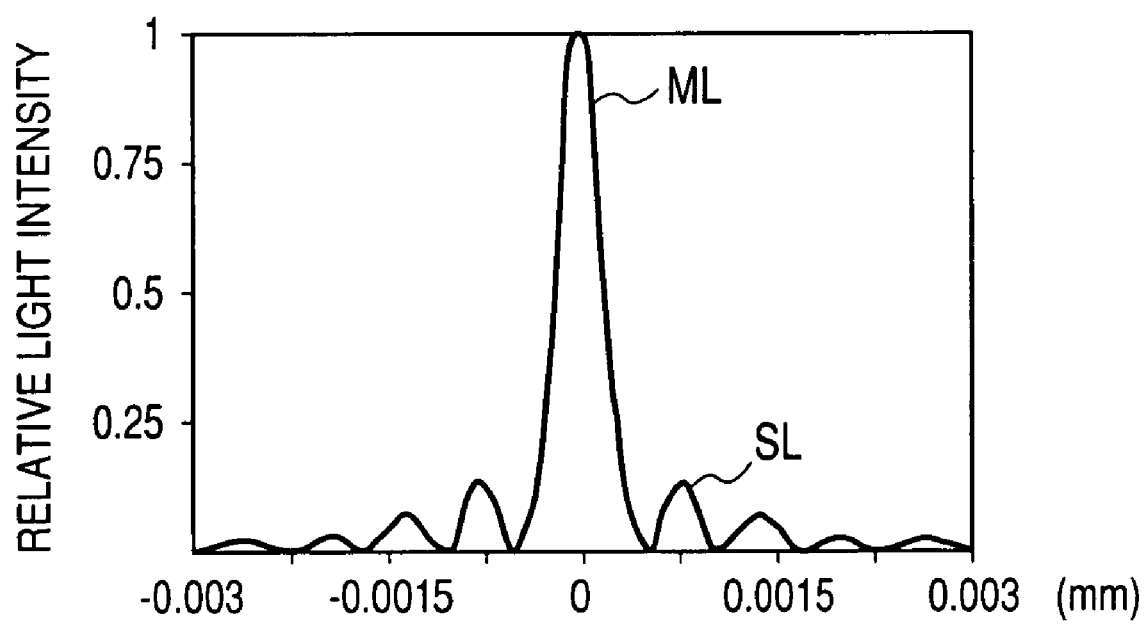
FIG. 15 is a point image light intensity distribution chart when the light beam having the wavelength for the DVD is focused on the signal plane of the DVD by the optical pickup device in FIG. 2.

However, the optical path and point image light intensity distribution when the optical pickup device in FIG. 2 using the phase correcting element 13A in FIG. 3 and the light beam limiting element 18 in FIG. 4 focuses a light beam having the wavelength λ1 for the DVD on the signal plane of the optical recording medium (DVD) 2-2 become as shown in FIGS. 14 and 15. The spot diameter of a main lobe ML is small while the intensity of each side lobe SL is high. This is a phenomenon called a super-resolution effect which is caused by making contribution on the periphery of a light beam diameter larger than near the center. A super-resolution effect is well-known as a method for making a spot diameter on the optical recording medium signal plane not more than a diffraction limit. If the peak intensity of any side lobe SL is $1/e^2$ or more that of the main lobe ML, a reproduced signal may deteriorate due to crosstalk. Accordingly, the phase correcting element 13A in FIG. 3 cannot be put to practical use without change.

Figure 16:
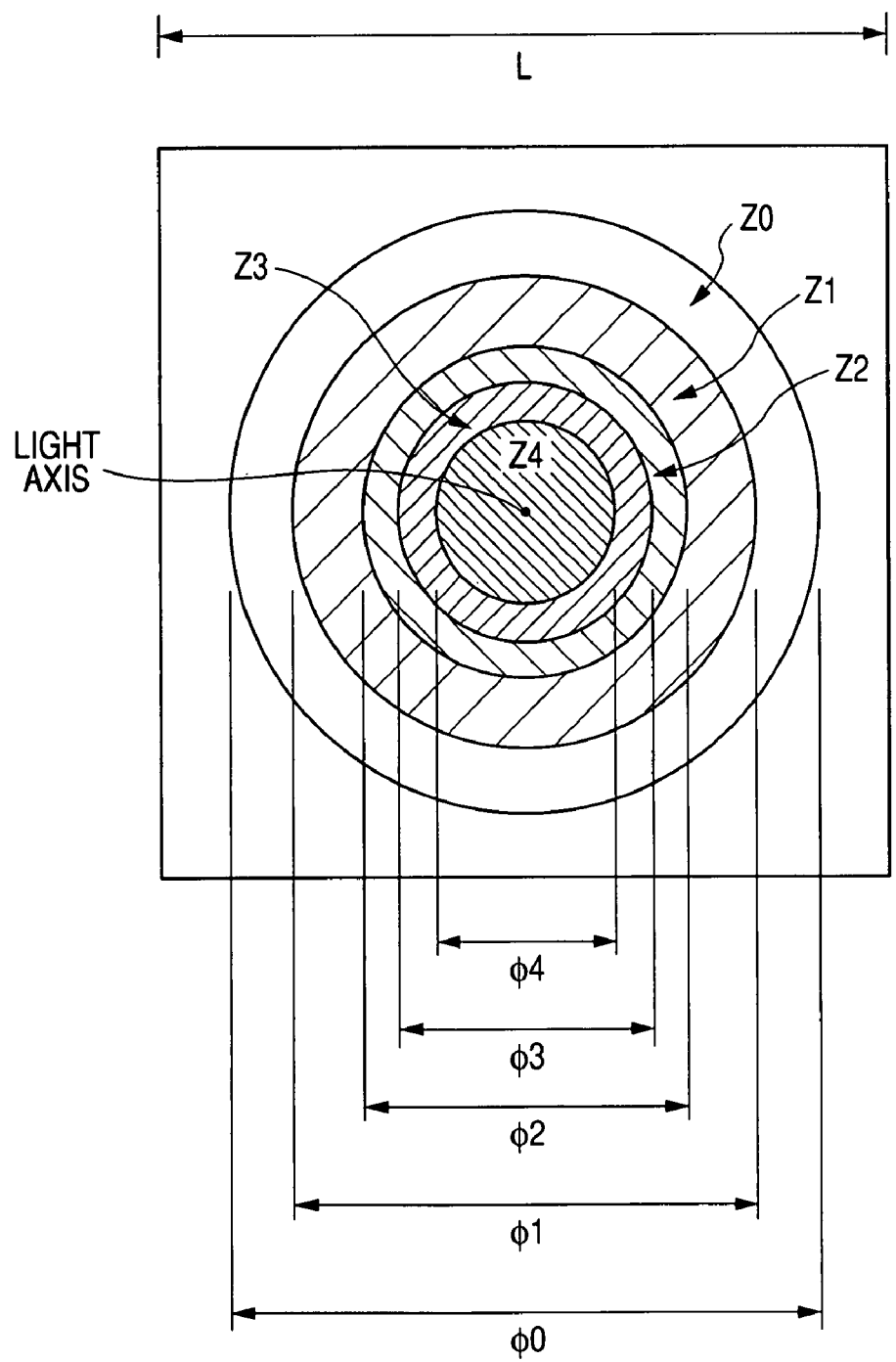
FIG. 16 is a plan view of a phase, correcting element according to an embodiment of the present invention (a first embodiment)

FIG. 16 is a plan view of a phase correcting element according to the embodiment of the present invention, as seen from the direction of the light axis. FIG. 16 shows an example of a phase correcting element in which the problem of crosstalk caused by a super-resolution effect is ameliorated. In this example, an apodization effect, which is an effect opposite to a super-resolution effect, is used. An apodization effect is embodied by making contribution near the center of a light beam diameter larger than on the periphery. A phase correcting element 13B is formed in the shape of a square plate and is formed such that an external size L is larger than the diameter of a circular region, φ0. The phase correcting element 13B has therein inside a toric first phase correcting zone (Z1) which is centered on the light axis and has an outer diameter of φ1 and an inner diameter of φ2, a toric second phase correcting zone (Z2) which is centered on the light axis and has an outer diameter of φ2 and an inner diameter of φ3 (φ2>φ3>0), a toric third phase correcting zone (Z3) which is centered on the light axis and has an outer diameter of φ3 and an inner diameter of φ4 (φ3>φ4>0), and a disciform fourth phase correcting zone (Z4) which is centered on the light axis and has an outer diameter of φ4. Reference characters φ0, φ1, and φ2 denote values for light beam diameters corresponding to the Nas: NA0, NA1, and NA2, for the next generation DVD, DVD, and CD, and the relation φ0>φ1>φ2 holds. The first phase correcting zone Z1 is configured to be the same as the first phase correcting zone W1 in FIG. 3, and the third phase correcting zone Z3 is configured to be the same as a part whose diameter φ satisfies φ3≧φ≧φ4 when the first phase correcting zone W1 is hypothetically expanded such that the inner diameter becomes φ4. The first and third phase correcting zones Z1 and Z3 are diffraction optical zones, each exhibiting a pseudo-kinoform shape having stepped structures in cross section. Groove pitches P of the stepped structures are so set as to correct the spherical aberration to a light beam having the wavelength λ1 for the DVD by phase correction, and a step height h of the stepped structures is set such that a phase shift ψ becomes an integer multiple of 2π with respect to the wavelength λ0 for the next generation DVD (although a maximum depth D of grooves deviates from λ1/(n(λ1)−1), a decrease of diffraction efficiency can be suppressed by setting the number of steps and the height h such that the maximum depth D becomes close to an integer multiple of λ1/(n(λ1)−1)). The second phase correcting zone Z2 is configured to be the same as a part whose diameter φ satisfies φ2≧φ≧φ3 of the second phase correcting zone W2 in FIG. 3, and the fourth phase correcting zone Z4 is configured to be the same as a part whose diameter φ satisfies φ4≧φ≧0 of the second phase correcting zone W2. The second and fourth phase correcting zones Z2 and Z4 are diffraction optical zones, each exhibiting a pseudo-kinoform shape having stepped structures in cross section. The groove pitches P of the stepped structures are so set as to correct the spherical aberration to a light beam having the wavelength λ2 for the CD by phase correction, and the step height h of the stepped structures is set such that the phase shift ψ becomes an integer multiple of 2π with respect to the wavelength λ0 for the next generation DVD (although the maximum depth D of grooves deviates from λ2/(n(λ2)−1), a decrease of diffraction efficiency can be suppressed by setting the number of steps and the height h such that the maximum depth D becomes close to an integer multiple of λ2/(n(λ2)−1)). A part as a zone Z0 whose diameter φ satisfies φ0≧φ≧φ1 is the same as the zone W0 in FIG. 3 and is a zone transparent to a light beam having the wavelength λ0 corresponding to the next generation DVD. The whole of a zone whose diameter φ satisfies φ0≧φ, including the first to fourth phase correcting zones Z1 to Z4 and the zone Z0, allow a light beam having the wavelength λ0 corresponding to the next generation DVD to pass therethrough without changing its parallel light beam state (with an equiphase wave surface kept planar). Note that φ3 only needs to be set to be not more than 0.9×φ2 in order to achieve good point image light intensity distribution and is preferably set to approximately 0.85×φ2.

Figure 17:
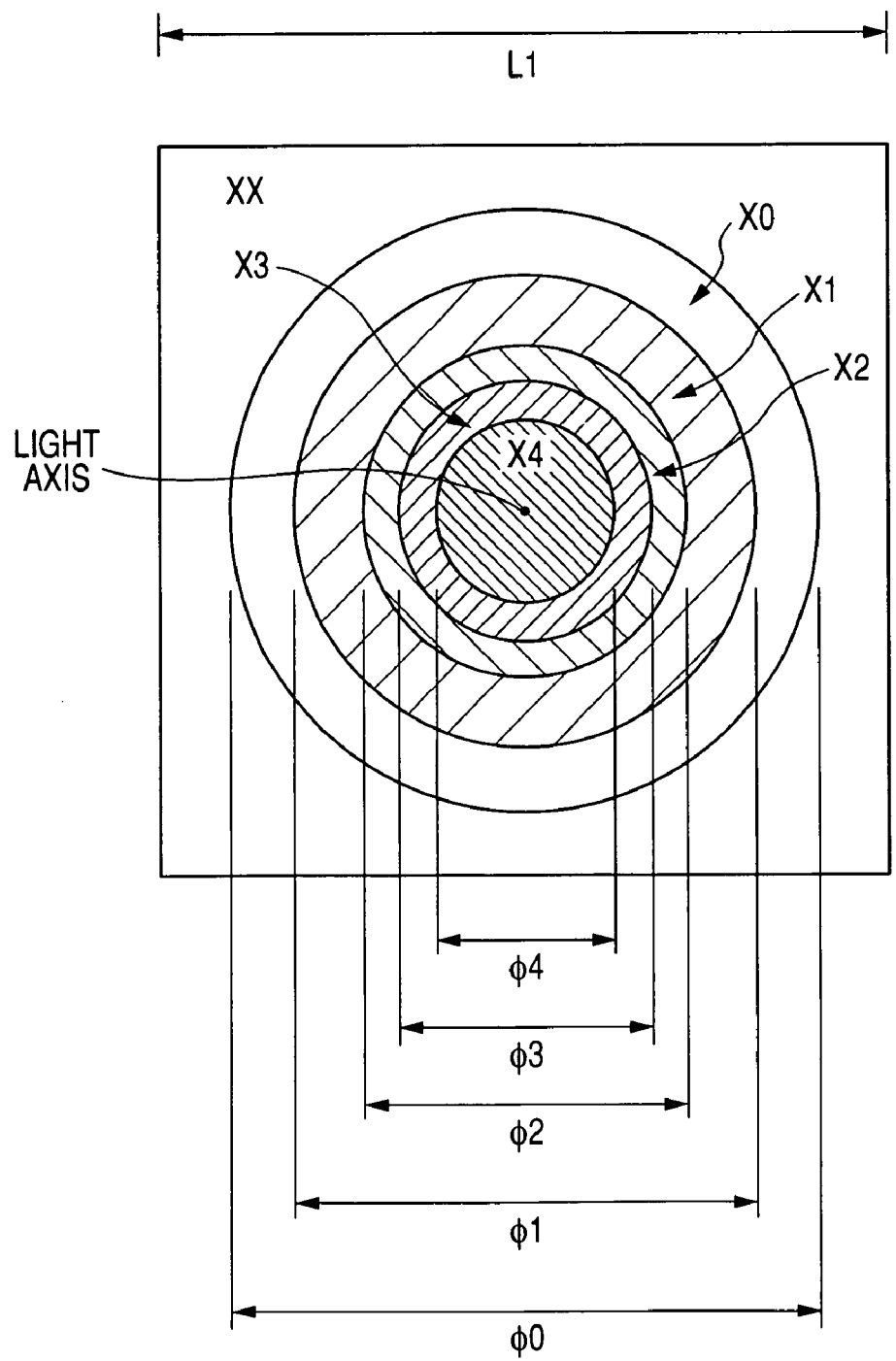
FIG. 17 is a plan view of a light beam limiting element according to the embodiment of the present invention.
Figure 18:
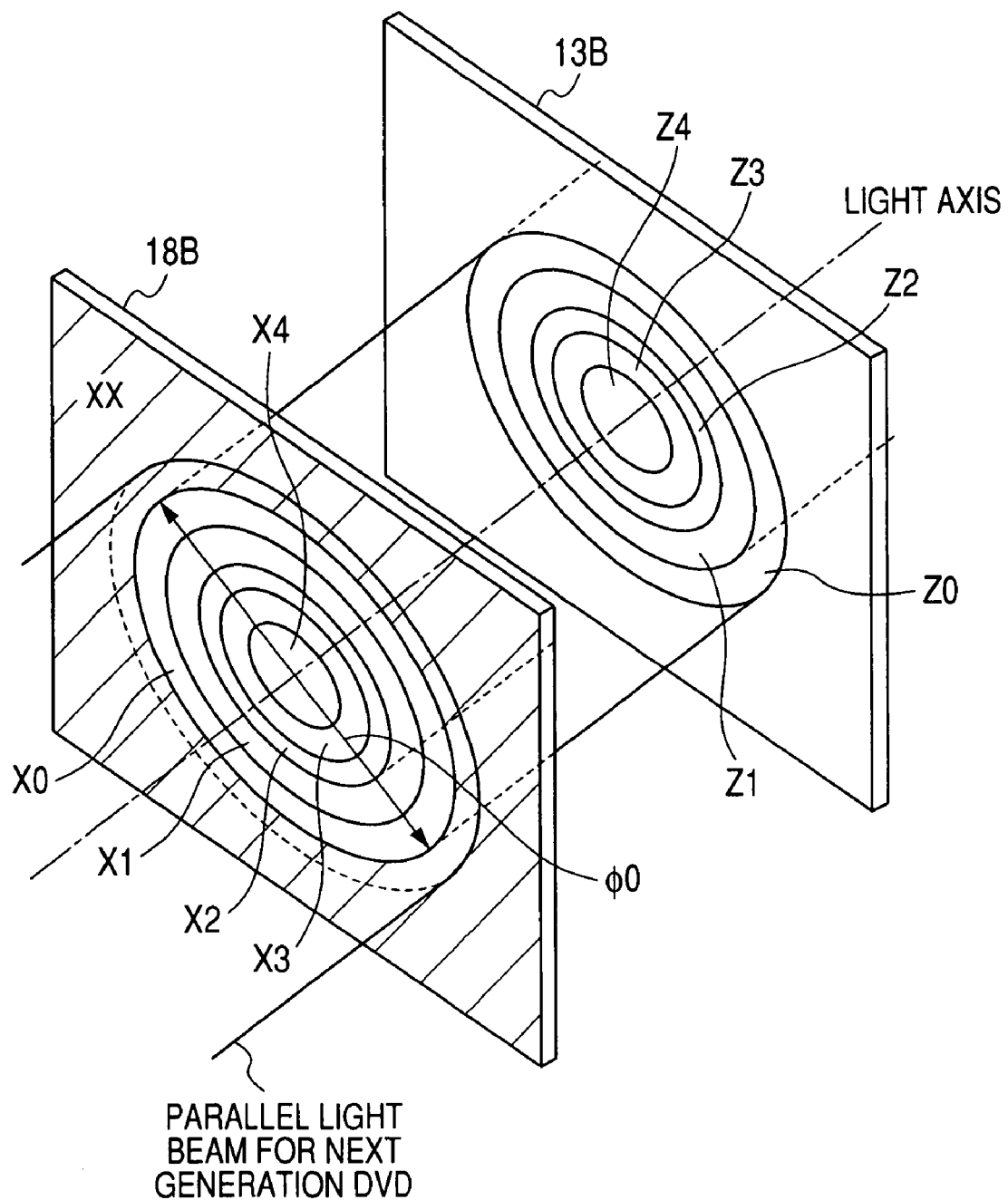
FIG. 18 is a perspective view for explaining the action of the light beam limiting element when a light beam for the next generation DVD comes incident.
Figure 19:
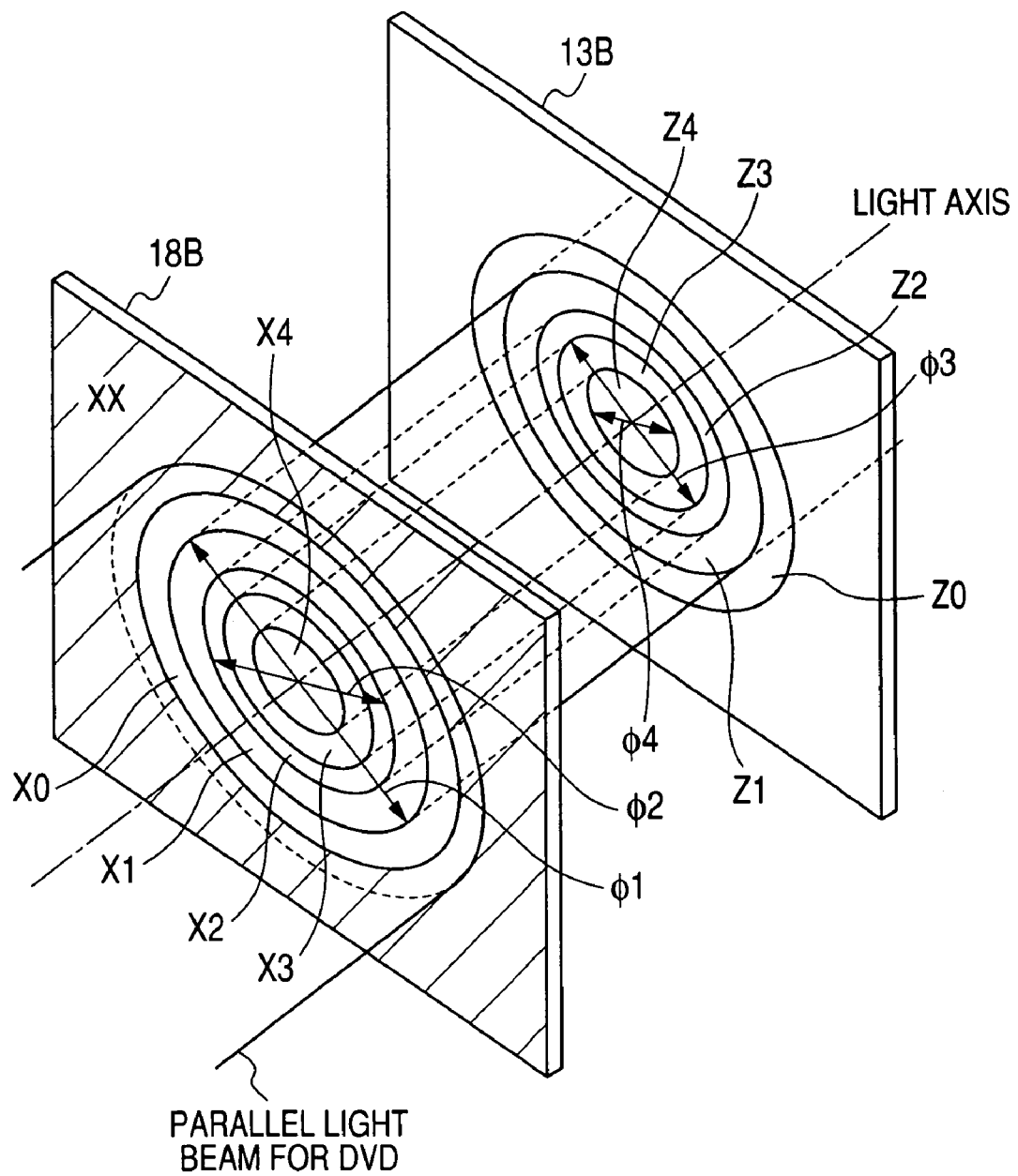
FIG. 19 is a perspective view for explaining the action of the light beam limiting element when a light beam for the DVD comes incident.
Figure 20:
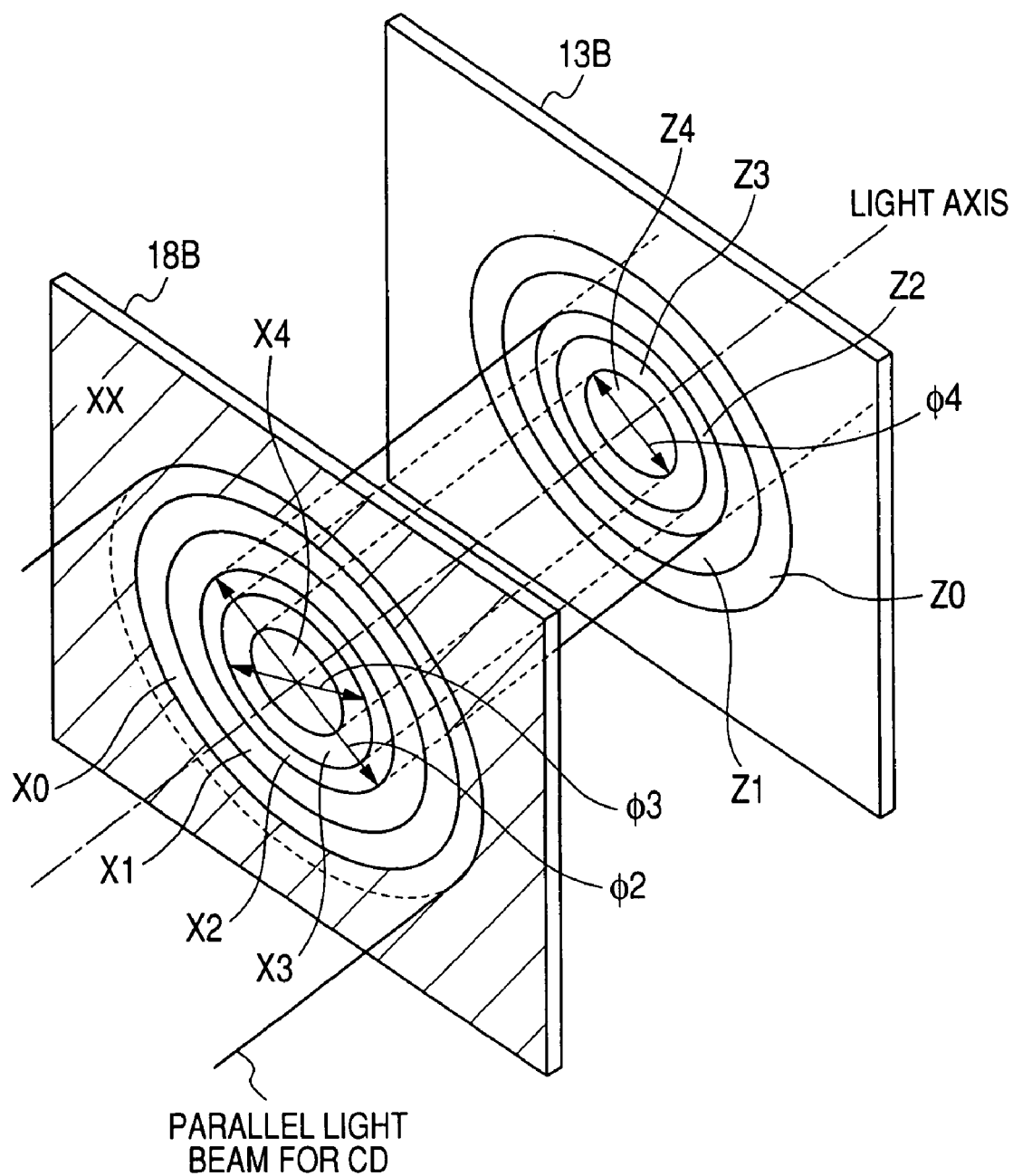
FIG. 20 is a perspective view for explaining the action of the light beam limiting element when a light beam for the CD comes incident.

FIG. 17 is a plan view of a light beam limiting element 18B which is used in combination with the phase correcting element 13B, as seen in the direction of the light beam. The light beam limiting element 18B is also formed in the shape of a square plate, and parallel light beams having the wavelengths of λ0, λ1, and λ2 for the next generation DVD, DVD, and CD perpendicularly come incident on the beam restriction element 18B. The light beam limiting element 18B is formed such that an external size L1 is the same as that of the light beam limiting element 18 in FIG. 4 and is larger than any one of the light beam diameters of parallel light beams having the wavelengths of λ0, λ1, and λ2 for the next generation DVD, DVD, and CD. The light beam limiting element 18B has thereinside first to fourth transparent regions X1 to X4 having wavelength selectivity which are centered on the light axis and have the same shapes and sizes as the first to fourth phase correcting zones Z1 to Z4 of the phase correcting element 13B and a toric outer transparent region X0 having wavelength selectivity which has an outer diameter of φ0 and an inner diameter of φ1. Outside the outer transparent region X0 having wavelength selectivity is a blocking zone XX, which blocks any one of light beams having the wavelengths of λ0, λ1, and λ2 for the next generation DVD, DVD, and CD. The outer transparent region X0 having wavelength selectivity allows the wavelength λ0 for the next generation DVD to pass therethrough and blocks the wavelengths of λ1 and λ2 for the DVD and CD. The first and third transparent regions X1 and X3 having wavelength selectivity allow the wavelengths of λ0 and λ1 for the next generation DVD and DVD to pass therethrough and block the wavelength λ2 for the CD. The second and fourth transparent regions X2 and X4 having wavelength selectivity allow the wavelengths of λ0 and λ2 for the next generation DVD and CD to pass therethrough and block the wavelength λ1 for the DVD. For this reason, the wavelength λ0 for the next generation DVD is limited to within a range which has a light beam diameter of φ0 centered on the light axis and comes incident on the first to fourth phase correcting zones Z1 to Z4 and the zone Z0 of the phase correcting element 13B (see FIG. 18). The wavelength λ1 for the DVD is limited to within a range which has a light beam diameter of φ1 centered on the light axis and is also limited to a part whose diameter falls within the range of φ1 to φ2 and a part whose diameter falls within the range of φ3 to φ4. The wavelength λ1 comes incident on the first and third phase correcting zones Z1 and Z3 of the phase correcting element 13B (see FIG. 19). The wavelength λ2 for the CD is limited to within a range which has a light beam diameter of φ2 centered on the light axis and is also limited to a part whose diameter falls within the range of φ2 to φ3 and a part whose diameter falls within the range of not more than φ4. The wavelength λ2 comes incident on the second and fourth phase correcting zones Z2 and Z4 of the phase correcting element 13B (see FIG. 20).

Figure 21:
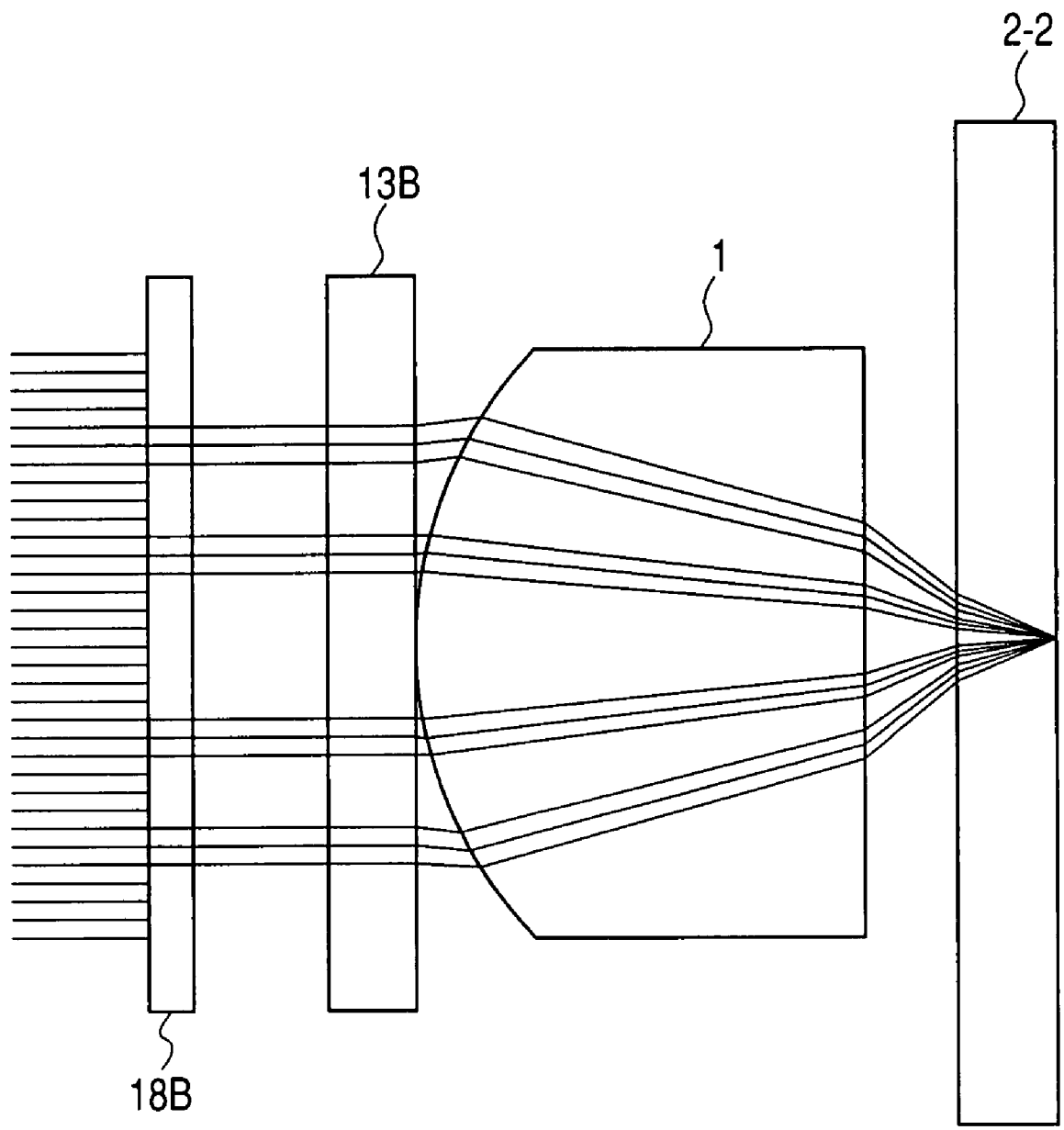
FIG. 21 is a view of an optical path when a light beam having the wavelength for the DVD is focused on the signal plane of the DVD by an optical pickup device using the phase correcting element in FIG. 16 and the light beam limiting element in FIG. 17.
Figure 22:
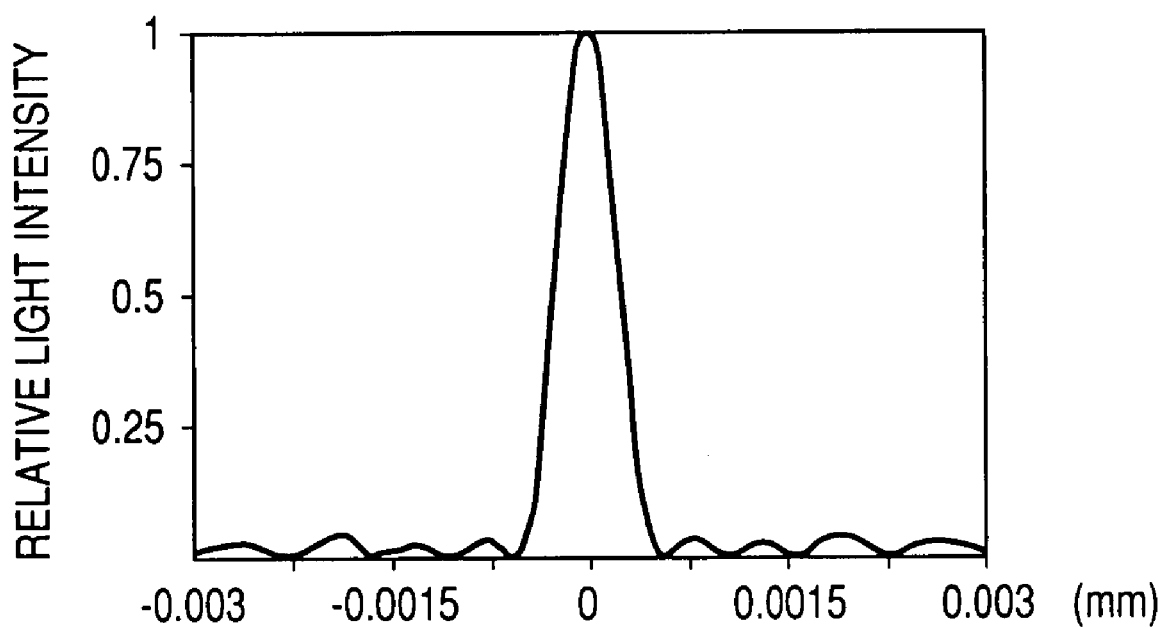
FIG. 22 is a point image light intensity distribution chart when the light beam having the wavelength for the DVD is focused on the signal plane of the DVD by the optical pickup device using the phase correcting element in FIG. 16 and the light beam limiting element in FIG. 17.
Figure 23:
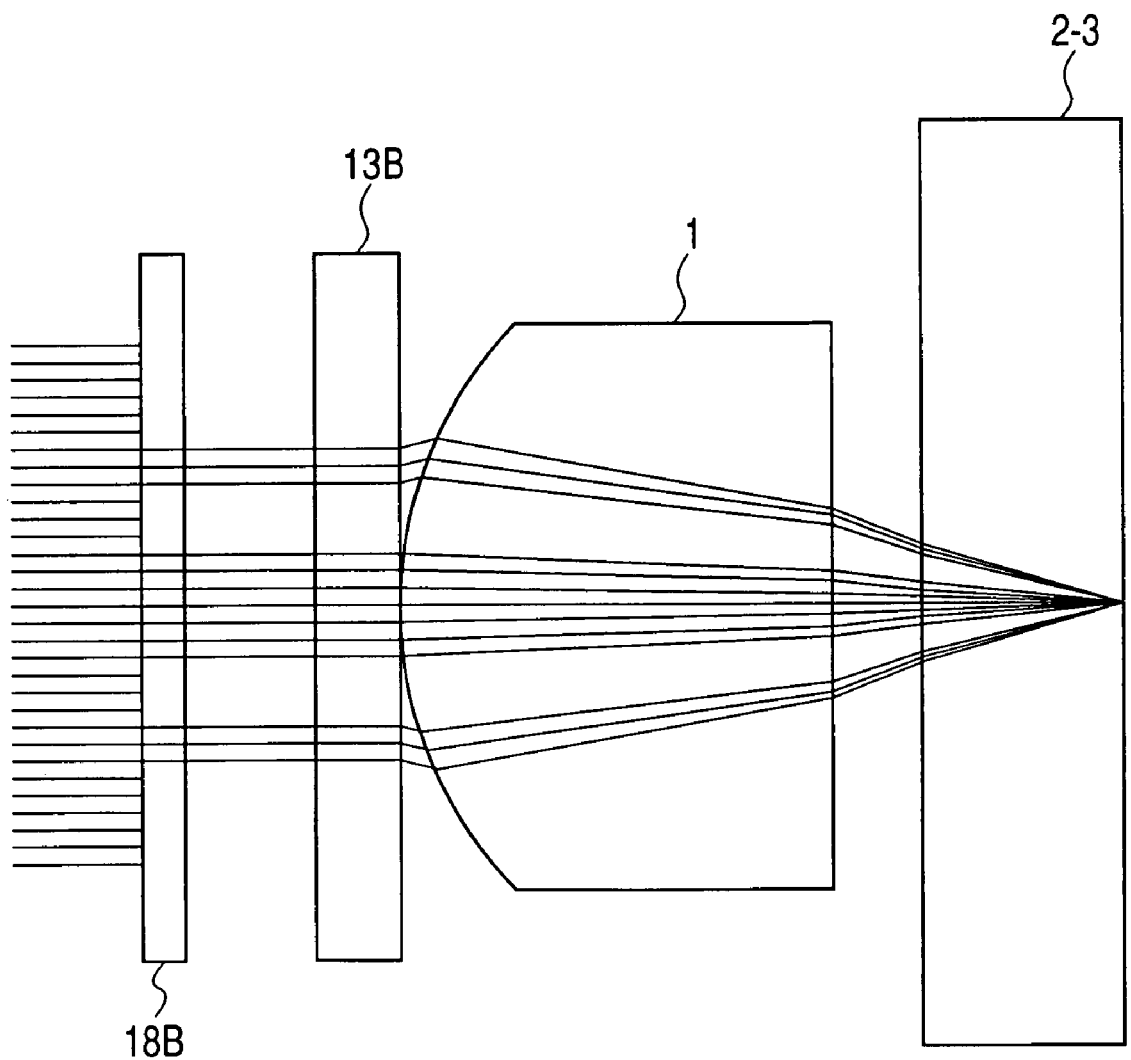
FIG. 23 is a view of an optical path when a light beam having the wavelength for the CD is focused on the signal plane of the CD by the optical pickup device using the phase correcting element in FIG. 16 and the light beam limiting element in FIG. 17.
Figure 24:
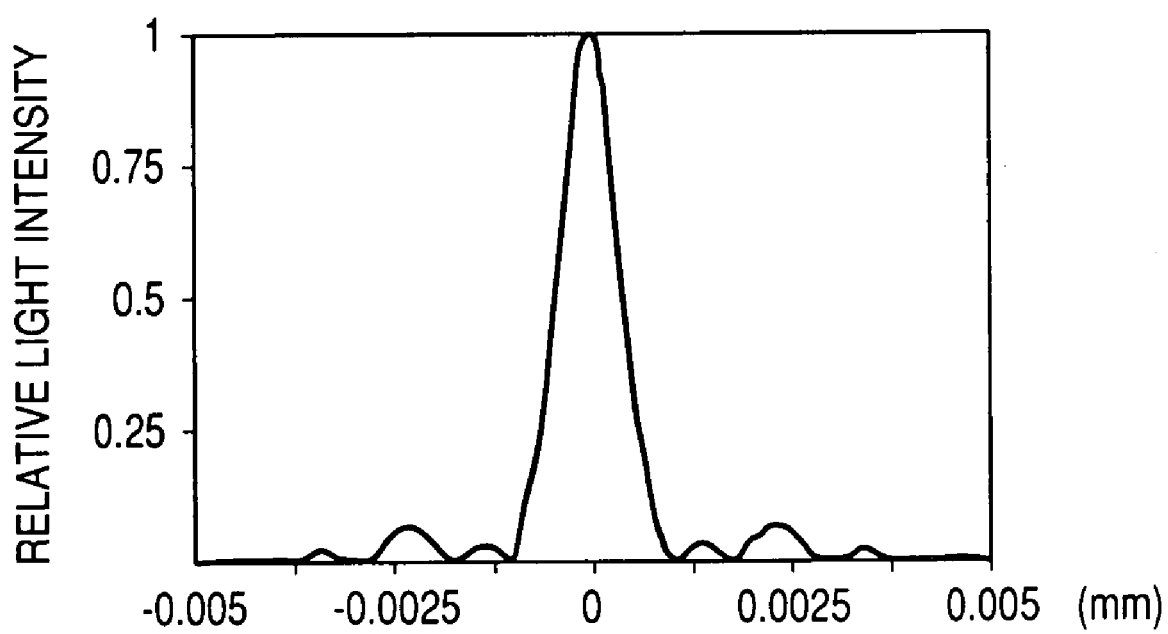
FIG. 24 is a point image light intensity distribution chart when the light beam having the wavelength for the CD is focused on the signal plane of the CD by the optical pickup device using the phase correcting element in FIG. 16 and the light beam limiting element in FIG. 17.
Figure 25:
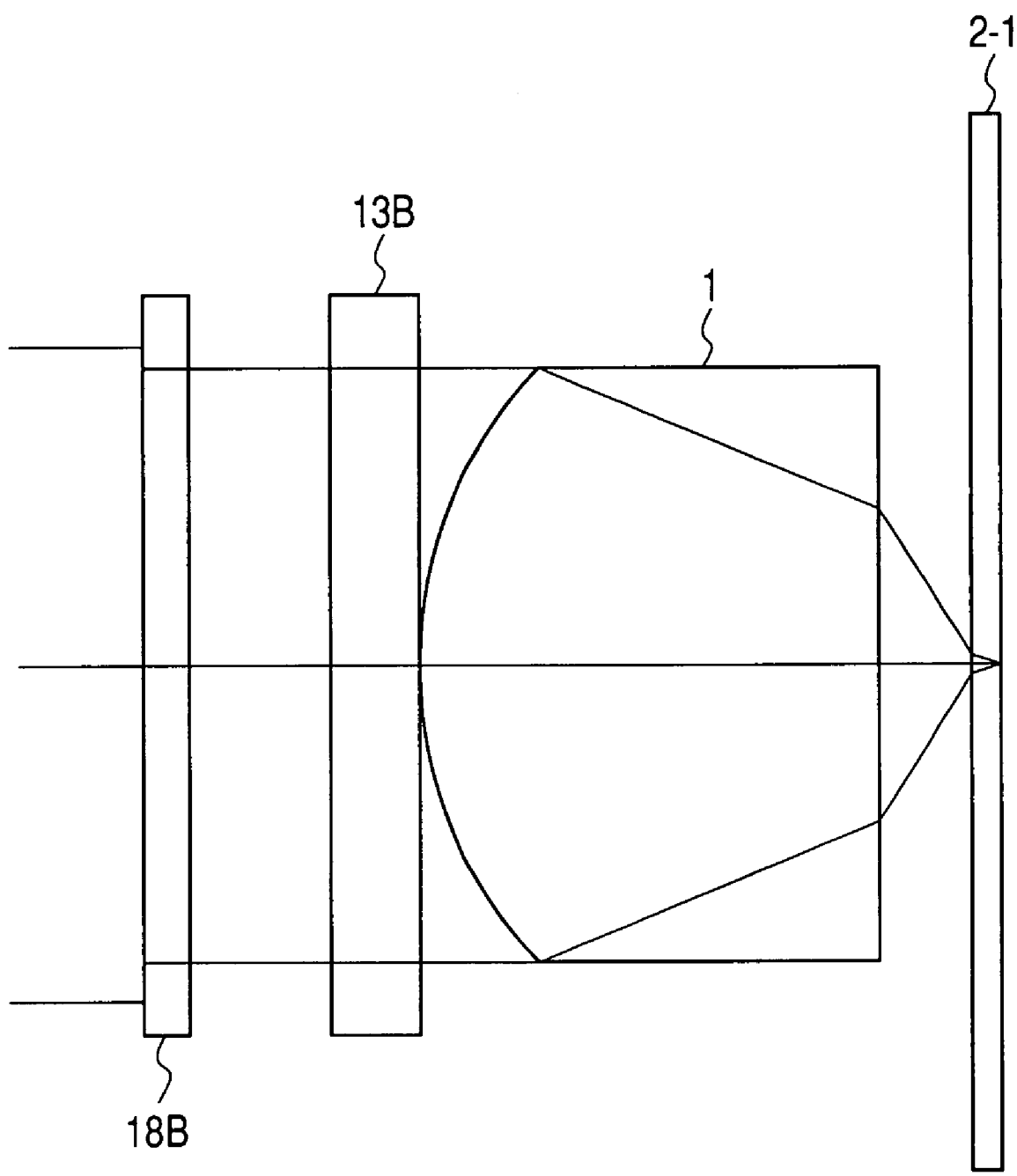
FIG. 25 is a view of an optical path when a light beam having the wavelength for the next generation DVD is focused on the signal plane of the next generation DVD by the optical pickup device using the phase correcting element in FIG. 16 and the light beam limiting element in FIG. 17.
Figure 26:
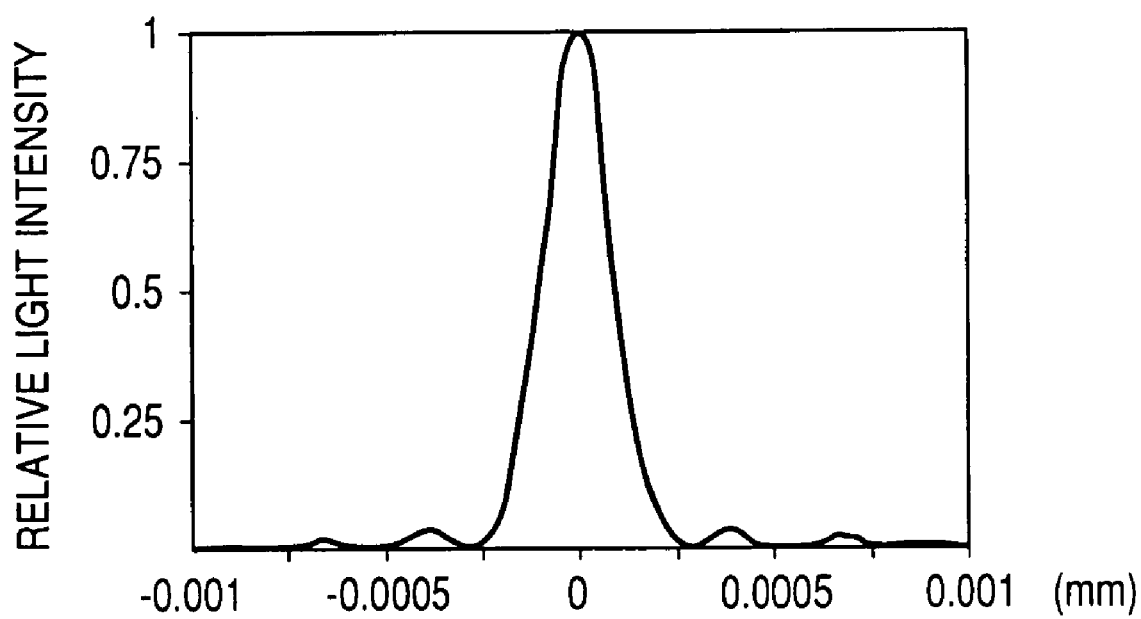
FIG. 26 is a point image light intensity distribution chart when the light beam having the wavelength for the next generation DVD is focused on the signal plane of the next generation DVD by the optical pickup device using the phase correcting element in FIG. 16 and the light beam limiting element in FIG. 17.

Assume that the phase correcting element 13A and the light beam limiting element 18 of the optical pickup in FIG. 2 are replaced with the phase correcting element 13B in FIG. 16 and the light beam limiting element 18B in FIG. 17, respectively, φ0, φ1, φ2, φ3, and φ4 are set to 3.1 mm, 2.2 mm, 1.8 mm, 0.85×φ2=1.2 mm, and 0.6 mm, respectively, the material for the phase correcting element 13B including the phase correcting zones is BK7, the number of steps, the step height h, and the maximum groove depth D of the stepped structures of the first and third phase correcting zones Z1 and Z3 are 5, 0.764 μm, and 3.819 μm, respectively, and the number of steps, the step height h, and the maximum groove depth D of the stepped structures of the second and fourth phase correcting zones Z2 and Z4 are 4, 0.764 μm, and 3.055 μm, respectively. In this case, the optical path and point image light intensity distribution when a light beam having the wavelength λ1 for the DVD is focused on the signal plane of the optical recording medium (DVD) 2-2 become as shown in FIGS. 21 and 22. The optical path and point image light intensity distribution when a light beam having the wavelength λ2 for the CD is focused on the signal plane of the optical recording medium (CD) 2-3 become as shown in FIGS. 23 and 24. The optical path and point image light intensity distribution when a light beam having the wavelength λ0 for the next generation DVD is focused on the signal plane of the optical recording medium (next generation DVD) 2-1 become as shown in FIGS. 25 and 26. It is clear from FIGS. 22 and 24 that, as for each of the DVD and CD, the peak intensities of side lobes SL are reduced to $1/e^2$ or less that of a main lobe ML, and a super-resolution effect is ameliorated. It is also clear from FIG. 26 that, as for the next generation DVD, there is no particular problem with the ratio of the peak intensities of side lobes SL to that of a main lobe ML. Note that the inner diameter of the first phase correcting zone Z1 is preferably set to approximately $0.85 \times \phi 1$ in order to achieve good point image light intensity distribution.

According to the phase correcting element 13B in FIG. 16 and the light beam limiting element 18B in FIG. 17, if the common objective lens 1, which focuses light beams corresponding to the optical recording media, the next generation DVD, DVD, and CD, is formed such that the wave front aberration to a light beam as a parallel light beam having the wavelength $\lambda 0$ for the next generation DVD is minimum on the signal plane of the optical recording medium (next generation DVD) 2-1, the phase correcting element 13B can correct, by phase correction, the spherical aberration to each of light beams except for one specific to the next generation DVD, the two light beams as parallel light beams having the wavelengths $\lambda 1$ and $\lambda 2$ for the DVD and CD. It is possible to, if correction of the spherical aberration to each of light beams having the two wavelengths is necessary, prevent exacerbation of spherical aberration during tracking of the objective lens without using a finite optical system and secure the flexibility in configuring the optical system.

Since each phase correcting zone of the phase correcting element 13B is configured to be a diffraction optical zone exhibiting a pseudo-kinoform shape having stepped structures with two or more steps in cross section which is made to resemble a kinoform shape, spherical aberration can be corrected with low loss. Each step height is set such that a phase shift when a light beam for the next generation DVD passes through one step becomes an integer multiple of $2\pi$. Accordingly, even if a light beam for the next generation DVD passes through the phase correcting zones, its parallel light beam state does not change, and the wave front aberration is not exacerbated.

Since only a light beam for the next generation DVD is allowed to pass through the phase correcting element 13B without changing its parallel beam state, there are not many restrictions on the types of glass materials available for use in the phase correcting element 13B.

Note that in the above-described embodiment, since the phase correcting zones of the phase correcting element 13B correspond to the NAs of optical recording media having specifications different from one another, the capability to correct spherical aberration is reduced if there is a positional shift between the phase correcting element 13B and the light beam limiting element 18B. Accordingly, it is advisable to form the phase correcting zones and the light beam restriction zones on the two surfaces of a single substrate or fasten the phase correcting element and light beam limiting element together by bonding or the like and integrate them into one piece.

In the embodiment, since the amount of phase correction at the distance r from the light axis by the phase correcting element corresponds to the amount of spherical aberration at the distance r from the light axis caused by the objective lens and a protecting substrate of an optical recording medium, a positional shift between the objective lens and the phase correcting element reduces the capability to correct spherical aberration. Accordingly, it is advisable to cause a holding mechanism for the objective lens to hold the phase correcting element and/or light beam limiting element together with the objective lens so as not to cause a positional shift during operation in focusing and tracking directions of the objective lens.

Even if each phase correcting zone is configured to be a rectangular diffraction optical zone or a phase correcting zone using a liquid crystal aberration correcting element, instead of being configured to take a pseudo-kinoform shape having stepped structures in cross section, phase correction can be similarly performed.

Alternatively, a phase correcting zone may be formed on an objective lens.

INDUSTRIAL APPLICABILITY

The present invention can be applied to an optical disk device which plays back data from or/and records data on a plurality of optical recording media, such as a next generation DVD, DVD, or/and CD, having specifications different from one another.

The invention claimed is:

1. An optical pickup device including k light emitting elements which radiate light beams having wavelengths different from one another corresponding to k optical recording media different from one another in specifications including a used wavelength, a numerical aperture (NA), and a thickness of a signal plane protecting substrate, a common objective lens which focuses the light beams radiated from the light emitting elements on the k optical recording media, which are interchangeably mounted at a predetermined location, and an optical system which transforms the light beams radiated from the light emitting elements into parallel light beams and guides the parallel light beams to the objective lens such that axes coincide with a light axis of the objective lens, characterized in that light beam restriction means and phase correcting means are located backward and forward between the optical system and the objective lens such that said phase correcting means are nearer the objective lens in relation to said light beam restriction means, said light beam restriction means propagate each of the k light beams having the different wavelengths only at a portion, and said phase correcting means correct phases of the k light beams, at least 2 k concentric toric or disciform phase correcting zones which do not overlap one another and are centered on a light axis are provided in said phase correcting means, each of the phase correcting zones exclusively performs phase correction on one of the k light beams having the different wavelengths, and said phase correcting means are configured such that each light beam undergoes phase correction in at least two of the phase correcting zones which are not adjacent to each other and are exclusive to the light beam, a plurality of transparent regions having wavelength selectivity which have respective same shapes as the phase correcting zones of said phase correcting means are provided around the light axis in said light beam restriction means, each of the phase correcting zones and a corresponding one of the transparent regions having wavelength selectivity, which have the same shape, are associated with each other, each of the transparent regions having wavelength selectivity propagates only the light beam having the wavelength, which is to be phase-corrected by the corresponding phase correcting zone, and said light beam restriction means are configured such that any one of the light beams having the wavelengths is not propagated at a region other than the transparent regions having wavelength selectivity.

2. An optical pickup device including two light emitting elements which radiate light beams having wavelengths different from each other corresponding to two optical recording media different from each other in specifications including a used wavelength, a numerical aperture (NA), and a thickness of a signal plane protecting substrate, a common objective lens which focuses the light beams radiated from the light emitting elements on the two optical recording media, which are interchangeably mounted at a predetermined location, and an optical system which transforms the light beams radiated from the light emitting elements into parallel light beams and guides the parallel light beams to the objective lens such that axes coincide with a light axis of the objective lens, light beam diameters of $\phi1$ and $\phi2$ commensurate with the numerical apertures for the two optical recording media satisfying a relation $\phi1 > \phi2$, characterized in that of the two light beams, one having the light beam diameter of $\phi1$ commensurate with the numerical aperture for the corresponding optical recording medium is referred to as a first light beam, and the other having the light beam diameter of $\phi2$ is referred to as a second light beam, thereby distinguishing the light beams from each other, light beam restriction means and phase correcting means are located backward and forward between the optical system and the objective lens such that said phase correcting means are nearer the objective lens in relation to said light beam restriction means, said light beam restriction means propagate each of the first and second light beams only at a portion, and said phase correcting means correct phases of the first and second light beams, a toric first phase correcting zone for the first light beam which has an outer diameter of $\phi1$ and an inner diameter smaller than $\phi1$ and not less than $\phi2$ and is centered on a light axis, a toric second phase correcting zone for the second light beam which has an outer diameter of $\phi2$ and an inner diameter of $\phi3$ smaller than $\phi2$ and larger than 0 and is centered on the light axis, a toric third phase correcting zone for the first light beam which has an outer diameter of not more than $\phi3$ and an inner diameter of $\phi4$ larger than 0 and is centered on the light axis, and a toric or disciform fourth phase correcting zone which has an outer diameter of not more than $\phi4$ and is centered on the light axis, in order from outermost to innermost, are provided in said phase correcting means, and four, first to fourth transparent regions having wavelength selectivity which have respective same shapes as the first to fourth phase correcting zones of said phase correcting means are provided around the light axis in said light beam restriction means, and said light beam restriction means are configured such that the first and third transparent regions having wavelength selectivity propagate the first light beam and do not propagate the second light beam, the second and fourth transparent regions having wavelength selectivity propagate the second light beam and do not propagate the first light beam, and either one of the first and second light beams is not propagated at a region other than the first to fourth transparent regions having wavelength selectivity.

3. The optical pickup device according to claim 2, characterized in that the inner diameter of the first phase correcting zone is set to be approximately $\phi1 \times 0.85$.

4. The optical pickup device according to claim 2, characterized in that the inner diameter of $\phi3$ of the second phase correcting zone is set to be approximately $\phi2 \times 0.85$.

5. The optical pickup device according to claim 2, characterized in that each phase correcting zone is formed using a diffraction optical region exhibiting a pseudo-kinoform shape having stepped structures with two or more steps in cross section.

6. The optical pickup device according to claim 2, characterized in that said phase correcting means and light beam restriction means are integrated into one piece by forming said phase correcting means and light beam restriction means on two sides of a common substrate or bonding said phase correcting means and light beam restriction means together.

7. The optical pickup device according to claim 2, characterized in that a holding mechanism for the objective lens is caused to hold said phase correcting means together with the objective lens.

8. The optical pickup device according to claim 2, characterized in that a holding mechanism for the objective lens is caused to hold said light beam restriction means and phase correcting means together with the objective lens.

9. An optical pickup device including three light emitting elements which radiate light beams having wavelengths different from one another corresponding to three optical recording media different from one another in specifications including a used wavelength, a numerical aperture (NA), and a thickness of a signal plane protecting substrate, a common objective lens which focuses the light beams radiated from the light emitting elements on the three optical recording media, which are interchangeably mounted at a predetermined location, and an optical system which transforms the light beams radiated from the light emitting elements into parallel light beams and guides the parallel light beams to the objective lens such that axes coincide with a light axis of the objective lens, the objective lens being formed such that wave front aberration when a specific one of the light beams is focused on a corresponding specific one of the optical recording media is minimum, light beam diameters of $\phi0$, $\phi1$, and $\phi2$ commensurate with the numerical apertures for the specific one optical recording medium and the other two optical recording media satisfying a relation $\phi0 > \phi1 > \phi2$, characterized in that of the light beams except for the specific one light beam, the two light beams, one having the light beam diameter of $\phi1$ commensurate with the numerical aperture for the corresponding optical recording medium is referred to as a first light beam, and the other having the light beam diameter of $\phi2$ is referred to as a second light beam, thereby distinguishing the light beams from each other, light beam restriction means and phase correcting means are located backward and forward between the optical system and the objective lens such that said phase correcting means are nearer the objective lens in relation to said light beam restriction means, said light beam restriction means propagate the specific one light beam at a whole of a portion corresponding to the light beam diameter of $\phi0$ commensurate with the numerical aperture for the specific one optical recording medium and propagate each of the first and second light beams only at a portion, and said phase correcting means propagate the specific one light beam without changing a parallel light beam state and correct phases of the first and second light beams, a toric first phase correcting zone for the first light beam which has an outer diameter of $\phi1$ and an inner diameter smaller than $\phi1$ and not less than $\phi2$ and is centered on a light axis, a toric second phase correcting zone for the second light beam which has an outer diameter of $\phi2$ and an inner diameter of $\phi3$ smaller than $\phi2$ and larger than 0 and is centered on the light axis, a toric third phase correcting zone for the first light beam which has an outer diameter of not more than φ3 and an inner diameter of φ4 larger than 0 and is centered on the light axis, and a toric or disciform fourth phase correcting zone which has an outer diameter of not more than φ4 and is centered on the light axis, in order from outermost to innermost, are provided in said phase correcting means, and four, first to fourth transparent regions having wavelength selectivity which have respective same shapes as the first to fourth phase correcting zones of said phase correcting means are provided around the light axis in said light beam restriction means, and said light beam restriction means are configured such that the first and third transparent regions having wavelength selectivity propagate the first light beam and specific one light beam and block the second light beam, the second and fourth transparent regions having wavelength selectivity propagate the second light beam and specific one light beam and block the first light beam, and either one of the first and second light beams is not propagated at a region other than the first to fourth transparent regions having wavelength selectivity.

10. The optical pickup device according to claim 9, characterized in that the inner diameter of the first phase correcting zone is set to be approximately φ1×0.85.

11. The optical pickup device according to claim 9, characterized in that the inner diameter of φ3 of the second phase correcting zone is set to be approximately φ2×0.85.

12. The optical pickup device according to claim 9, characterized in that each phase correcting zone is formed using a diffraction optical region exhibiting a pseudo-kinoform shape having stepped structures with two or more steps in cross section.

13. The optical pickup device according to claim 9, characterized in that each phase correcting zone is formed using a diffraction optical region exhibiting a pseudo-kinoform shape having stepped structures in cross section, a height h of steps of the stepped structures is set such that $\psi=2\pi(n-1)h/\lambda 0$, where $\lambda 0$ is the wavelength of the specific one light beam, n is a refractive index of the diffraction optical region with respect to the wavelength $\lambda 0$, and $\psi$ is a phase shift for the specific one light beam corresponding to one of the steps, becomes an integer multiple of $2\pi$.

14. The optical pickup device according to claim 9, characterized in that said phase correcting means and light beam restriction means are integrated into one piece by forming said phase correcting means and light beam restriction means on two sides of a common substrate or bonding said phase correcting means and light beam restriction means together.

15. The optical pickup device according to claim 9, characterized in that a holding mechanism for the objective lens is caused to hold said phase correcting means together with the objective lens.

16. The optical pickup device according to claim 9, characterized in that a holding mechanism for the objective lens is caused to hold said phase correcting means together with the objective lens.

* * * * *